(12) United States Patent
Hayashi

(10) Patent No.: US 8,554,646 B2
(45) Date of Patent: Oct. 8, 2013

(54) ACCOUNTING METHOD AND ACCOUNTING SYSTEM

(75) Inventor: Yuichiro Hayashi, Sakata (JP)

(73) Assignee: Yuichiro Hayashi, Sakata-shi (JP)

( * ) Notice: Subject to any disclaimer, the term of this patent is extended or adjusted under 35 U.S.C. 154(b) by 0 days.

(21) Appl. No.: 13/457,908

(22) Filed: Apr. 27, 2012

(65) Prior Publication Data

US 2013/0060666 A1 Mar. 7, 2013

Related U.S. Application Data

(63) Continuation of application No. PCT/JP2011/069926, filed on Sep. 1, 2011.

(30) Foreign Application Priority Data

Jan. 9, 2011 (WO) .................. PCT/JP2011/069226

(51) Int. Cl.
*G06Q 10/00* (2012.01)

(52) U.S. Cl.
CPC ....................................... *G06Q 10/00* (2013.01)
USPC ............................. 705/30; 705/7.28; 705/36 R

(58) Field of Classification Search
CPC ................................................. G06Q 10/0635
USPC .............................. 705/30, 7.28, 36 R; 702/3
See application file for complete search history.

(56) References Cited

U.S. PATENT DOCUMENTS

| 7,302,409 | B2 | 11/2007 | Hayashi |
| 7,930,050 | B2 * | 4/2011 | Wertheimer .................... 700/99 |
| 2003/0216977 | A1 | 11/2003 | Hayashi |

FOREIGN PATENT DOCUMENTS

| JP | 08-329170 A | 12/1996 |
| JP | 09-305677 A | 11/1997 |
| JP | 2003-331115 A | 11/2003 |

OTHER PUBLICATIONS

Lucas Mike, Absorption costing for decision-making, Management Accounting, Oct. 1997, 75, 9.*
Mike Walker, Attribute based costing, Australian Accounting, Mar. 1992, 62, 2.*
Japanese Office Action dated Mar. 5, 2013 in Application No. 2012-504960 and its English partial translation.

* cited by examiner

*Primary Examiner* — M. Thein
*Assistant Examiner* — Milena Racic
(74) *Attorney, Agent, or Firm* — Foley & Lardner LLP

(57) ABSTRACT

An accounting system under standard costing as absorption costing which identifies a break-even point, performs a process in which, in a break-even chart represented as a standard-costing marginal profit chart for a company or business line departments, a "net carryover manufacturing overhead allocation cost" $\eta$ of an inventory and a managed gross profit $Q^M$ (=Sales Amount X−Sales Absorption Cost) are defined, a managed fixed cost F (=$\eta$+Manufacturing Overhead C+General Administrative Cost G) is treated as a fixed cost, and the point of intersection between line segment OB' connecting the origin O (0, 0) and point B' (X, $V^s$) and horizontal line segment EN' taking the value of the managed fixed cost F is identified as a break-even point (point $H_2$'). Here, $V^s$ is the sum of the managed gross profit $Q^M$ and a sales manufacturing overhead allocation cost $A^{CX}$.

5 Claims, 16 Drawing Sheets

ACCOUNTING METHOD AND ACCOUNTING SYSTEM

This application is a continuation of PCT/JP2011/069926, filed on Sep. 1, 2011.

BACKGROUND OF THE INVENTION

1. Field of the Invention

The present invention generally relates to an accounting method and to an accounting system for a company that uses absorption costing represented by standard costing, and more particularly, relates to an accounting method and to an accounting system that transmits a client including the company employees accounting data through a computer information network processing the accounting data which are based on standard costing, draws break-even charts including a marginal profit chart corresponding to standard costing, and provides the client with the charts through the computer information network.

2. Description of Related Art

Generally, people may not have a sense of the relationship between costs (C), volumes (V) and profits (P) (hereinafter, referred to as CVP) even while looking at figures in a profit and loss statement (hereinafter, referred to as P/L), but can have a sense of the CVP relationship when the relationship is represented in a chart. Since the end of the 19th century, in Japan, the United States of America and other countries, public P/Ls are generated based on absorption costing in accordance with financial accounting standards. In absorption costing, manufacturing overhead is allocated not only to goods sold but also to inventory. This has caused a great deal of difficulty in generating the CVP charts.

Standard costing is believed to have originated in England around 1870, that is, the end of the development of the industrial revolution, and standard costing is a representative example in absorption costing and a historical costing method. In this specification, the term "standard costing" is used instead of the term "absorption costing". In standard costing, manufacturing overhead composed of fixed costs and variable costs is converted into variable costs as manufacturing overhead allocation costs, which are standard costs; and the variable costs are added to the costs of goods sold and inventory. Then, in accordance with accounting standards, the manufacturing overhead costs included in the goods sold and the inventory are reduced or increased using cost variances such that the standard costs are equivalent to the actual costs, thereby determining the costs of the goods sold and the inventory. Therefore, in standard costing, the manufacturing overhead allocation costs included in the inventory have an effect on a current operating profit.

In order to eliminate this effect, direct costing was proposed by Jonathan N. Harris in the United States of America in 1936. Direct costing is a method that considers only direct variable costs as manufacturing activity costs, and separately treats the fixed manufacturing costs as a period cost, much like a general administrative cost. Since manufacturing overhead is not allocated to the inventory in direct costing, it is possible to easily make a break-even chart (CVP chart). Direct costing is currently not recognized for formal financial statements, but is positioned as a powerful method for management accounting. In this way, standard costing widely appears in accounting textbooks as a basis of accounting because of the necessity in financial accounting to determine the cost of goods sold and the inventory. However, since standard costing is disadvantaged in that it produces no profit charts, when it comes to management accounting, the use of standard costing is rather than not being recommended currently excluded, and direct costing is being recommended.

The applicant of this invention managed a company for a long period of time, and the company's costing method was standard costing. In the meantime, personal computers (hereinafter, referred to as PCs) have been rapidly spreading through the world. In general, it is said that the purpose of management accounting is for employees of a company to quickly provide a corporate manager with clear business management data including P/Ls. The applicant wanted to widely and quickly provide P/Ls as a yearly budget document, a monthly report and a closing statement through a company's network using PCs; the P/Ls are useful for each of the company members in order to make decisions on business activities; the members comprise ranks of employees including those in business line departments, manufacturing indirect cost departments and sales departments; the number of ranks of employees is much greater than that of managers and accounting employees.

Monetary sales amount is denoted by X. For convenience, in standard costing, manufacturing direct costs in all business line departments are assumed as actual costs, and all direct costs (actual costs) in manufacturing overhead costs are moved into manufacturing direct costs. Let $D^X$ denote the manufacturing direct costs. In this case, a current manufacturing overhead C (actual cost) is a fixed cost. Let $A^{CY}$ denote the total amount of manufacturing overhead allocation costs. The cost C is allocated to the goods sold by $A^{CY(0)}$ and to the inventory carried forward by $A^{CY(+)}$ as the total allocation costs being $A^{CY}$. This is represented by the equation of $A^{CY}=A^{CY(0)}+A^{CY(+)}$. Let denote $A^{CX(-)}$ previous-period carryover manufacturing overhead allocation costs distributed to goods sold; and $A^{CX}$ the total current manufacturing overhead allocation costs distributed to goods sold. Then the equations $A^{CX}=A^{CX(-)}+A^{CX(0)}$ and $A^{CX(0)}=A^{CY(0)}$ are obtained. Here, the sign 'η' is defined so as to satisfy $T_1=ACX(-)$ $ACY(+)=A^{CX}-A^{CY}$. If we denote absorption costs in absorption costing by $E^M$, we obtain $E^M=D^X+A^{CX}$. Let $\pi^O$ denote a sales operating profit defined in financial accounting.

In standard costing, on a manufacturing floor, a "gross profit $Q^M$ in management accounting" is understood as $Q^M=X-E^M=X-D^X-A^{CX}$, and maintaining a $Q^M$ or a $Q^M/X$ is continuously demanded from company management. Meanwhile, a "gross profit (sales gross profit) Q in financial accounting" is determined by $Q=X-D^X-(C+A^{CX(-)}-A^{CY(+)})=X-D^X-C-A^{CX}+A^{CY}$, and the company aims at making a Q. Since $Q^M \ne Q$, each concept of both gross profits is different.

In Japanese Laid-Open Patent Application Publication No. H09-305677, the applicant reported a theoretical formula-derivation method for drawing a profit chart applicable to practical accounting for a standard costing P/L. In the method the treatment of $Q^M$ was put at the center of the theoretical analysis. Thereafter, as described in U.S. Pat. No. 7,302,409, the applicant found that the issue had been studied and disclosed in 1968 by D. Solomons; and a chart drawing method and a standard-costing break-even point formula have appeared in textbooks. Furthermore, Solomons' theory is explained in detail in U.S. Pat. No. 7,302,409. However, his chart drawing method is not applicable in practical accounting and the standard-costing break-even point formula is different from that derived here by the applicant.

There can be only one solution for any mathematical problem. The applicant further studied, verified and presented, in U.S. Pat. No. 7,302,409, that the break-even point formula and the profit chart represented in Solomons' theory are wrong; and that the break-even point formula and the profit chart presented by the applicant are correct. Therefore, in standard costing, we have only the method presented here as the method for generating a profit chart which gives an answer of $\pi^O$ and which is applicable to practical accounting.

SUMMARY OF THE INVENTION

A coordinate plane in which the horizontal coordinate represents X and the vertical coordinate represents costs plus profit is provided. According to U.S. Pat. No. 7,302,409, a marginal managed gross profit line is the locus of $Q^M$ fulfilling $\pi^O=0$, and is an oblique line from top left to bottom right having the vertical-axis intercept of $F^S=C+\eta+G$ and the slope of $\tan\beta=A^{CX}/X$. Certainly, this is theoretically correct. However, in a marginal profit chart in direct costing, when the marginal profit is denoted by $V^D$ and a fixed cost in the cost items of $V^D$ by $F^D$, $F^D$ is expressed as the horizontal line of $F^D=C+G$. Therefore, no employees, irrespective of knowledge of direct costing method could not understand why the marginal managed gross profit line associated with $F^S$ (stressed as a fixed cost by the applicant) is an oblique line, and therefore the profit chart according to U.S. Pat. No. 7,302,409 has not been much used in his company. For this reason, the construction of a standard-costing profit chart theory in which $F^S$ is drawn as a horizontal line is necessary.

The managed gross profit chart disclosed in U.S. Pat. No. 7,302,409 is converted in such a way that the marginal managed gross profit line expressed as an oblique line becomes horizontal to derive a standard-costing marginal profit chart (SC marginal profit chart) having the same appearance as a direct-costing marginal profit chart (DC marginal profit chart).

Specifically, a computer reads a sales amount X, a direct manufacturing cost $D^X$, a manufacturing overhead C, a general administrative cost G, a manufacturing overhead allocation cost $A^{CX}$ distributed to goods sold, and a manufacturing overhead allocation cost $A^{CY}$ distributed to manufactured goods. The computer calculates a net carryover manufacturing overhead allocation cost $\eta$ using the manufacturing overhead allocation costs $A^{CX}$ and $A^{CY}$; calculates a managed gross profit $Q^M$ using the sales amount X, the direct manufacturing cost $D^X$ and the manufacturing overhead allocation cost $A^{CX}$; computes a managed fixed cost F using the manufacturing overhead C, the net carryover manufacturing overhead allocation cost and the general administrative cost G; and calculates a standard-costing marginal profit $V^S$ using the managed gross profit $Q^M$ and the manufacturing overhead allocation cost $A^{CX}$. Furthermore, a coordinate plane in which the horizontal axis represents a sales amount and the vertical axis represents costs plus profit is set. The computer locates point 0 at the origin (0, 0), point A at the coordinates (X, 0) and point B' at (X, V$^s$); draws line segment AB' and line segment OB'; places point E at (0, F), point N' at (X, F); draws line segment EN'; and generates a marginal profit chart that gives a break-even point through these processes under standard costing.

Standard costing has been criticized for a long time on the ground that $\pi^O$ is affected by the value of $\eta$ in the case of $\eta\neq0$, therefore it cannot be used in management accounting. However, this is but a minor problem. The real reason for the criticism is that there had been no CVP charts based on standard costing in accounting theory. This problem is solved because the profit charts presented here include direct-costing profit charts. That is, direct costing is just a special case of $\eta=0$ in the profit charts presented here. However, in standard costing, we have manufacturing overhead allocation costs $A^{CX}$ and $A^{CY}$ that are not seen among direct costing data items. These allocation costs exist in profit calculation even in the case of $\eta=0$, and play a significant role in a profit analysis. Therefore, it has been verified that the manufacturing overhead allocation method, which has been treated as an obstacle in management accounting, is actually a very effective tool for making a profit or a profit-and-loss analysis. Accordingly, the standard costing system based on the profit charts of the present invention will naturally become a standard profit management method, not only in financial accounting, but also in management accounting. As a result, the present invention will contribute considerably not only to management of all kinds of companies including manufacturing industries, but also to companies which develop standard costing accounting systems, accounting advisors and educational institutions etc.

DESCRIPTION OF THE PREFERRED EMBODIMENTS

Hereinafter, an embodiment according to the present proposed technique will be described in detail referring to the accompanying drawings.

Figure 1:
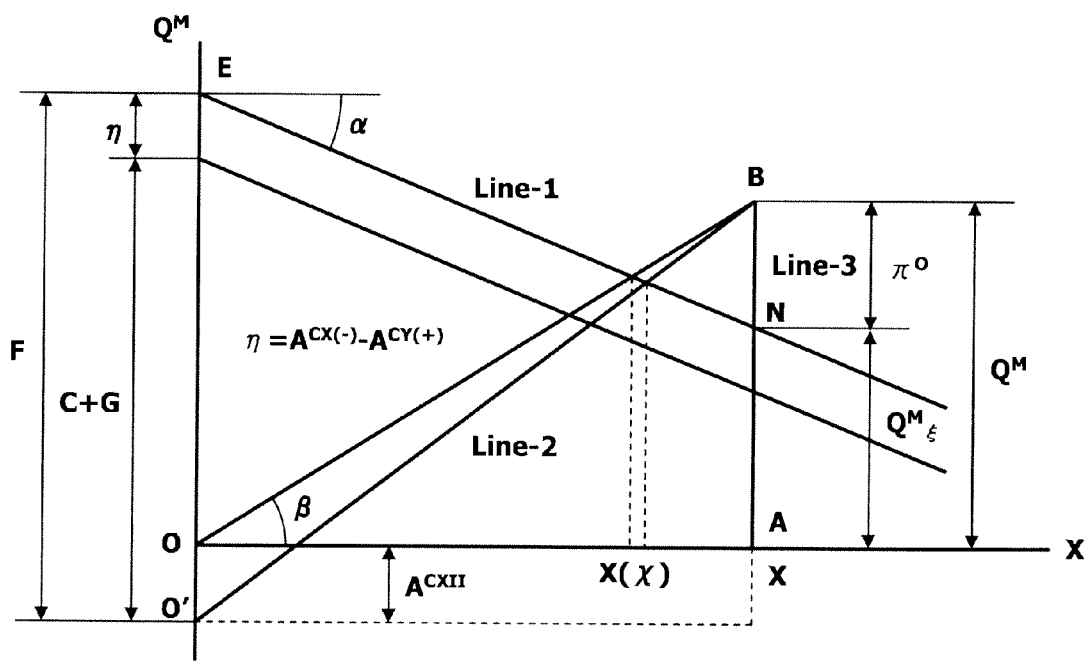
FIG. 1 is an explanatory view of a managed gross profit chart regarding a standard costing P/L, and this chart is a prior art presented in U.S. Pat. No. 7,302,409 by the applicant.
Figure 2:
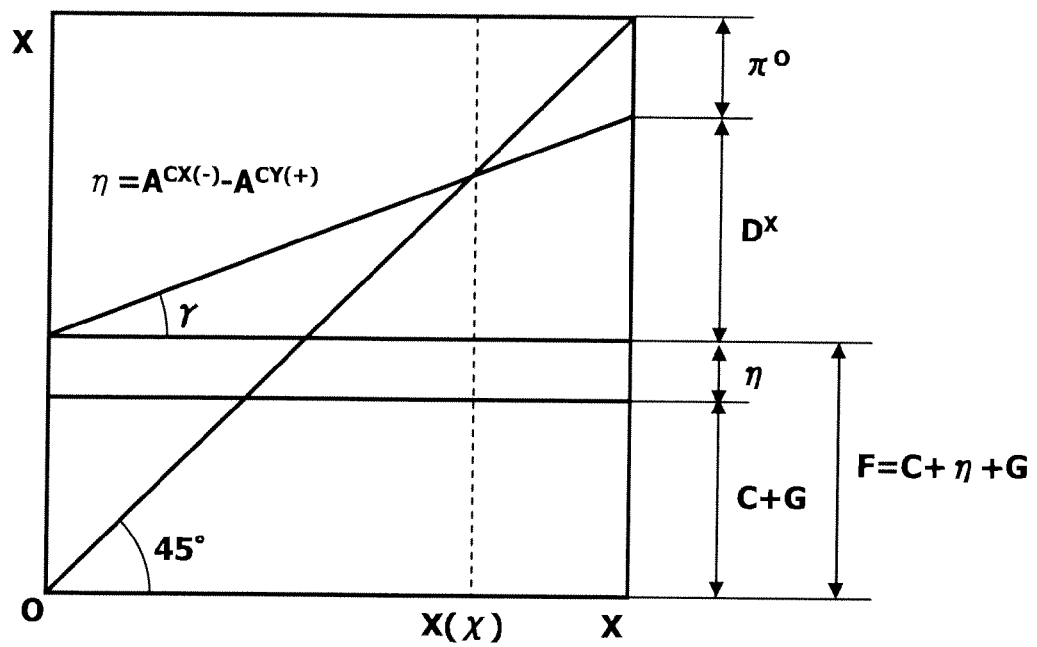
FIG. 2 is an explanatory view of a 45-degree-line break-even chart regarding a standard costing P/L, and this chart is a prior art presented in U.S. Pat. No. 7,302,409 by the applicant.

First, a derivation of theoretical formulae regarding provision of FIGS. 1 and 2 disclosed in U.S. Pat. No. 7,302,409 (Patent Document 2) will be briefly described. A P/L regarding a sales operating profit $\pi^O$ is expressed as shown in Table 1. Notation is represented in a description of items of each of the tables. For simplicity, it is assumed that G does not include a variable cost.

TABLE 1

| ITEM | DEBIT | CREDIT |
|---|---|---|
| SALES AMOUNT | | X |
| SALES MANUFACTURING DIRECT COST (ACTUAL) | $D^X$ | |
| SALES MANUFACTURING OVERHEAD ALLOCATION COST | $A^{CX(-)}$ | |
| MANUFACTURING OVERHEAD (ACTUAL) | C | |
| MANUFACTURING OVERHEAD ALLOCATION COST | | $A^{CY(+)}$ |
| GENERAL ADMINISTRATIVE COST | G | |
| SALES OPERATING PROFIT | $\pi^O$ | |

Equation 1 is obtained from Table 1.

$$X = D^X + C + \eta + G + \pi^O \tag{1}$$

where $\eta = A^{CX(-)} - A^{CY(+)}$. $\eta$ is named the "inventory manufacturing-overhead allocation-cost net-carryover-cost" or the "net carryover manufacturing overhead allocation cost".

Figure 3:
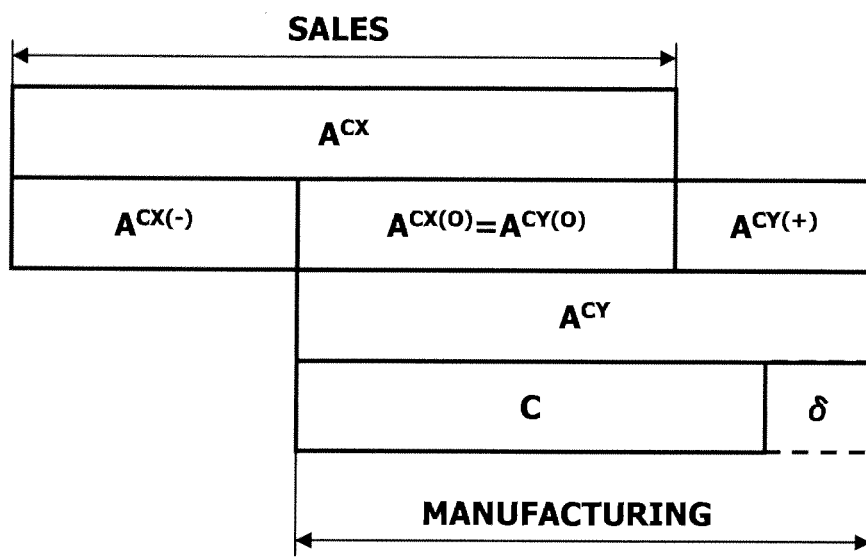
FIG. 3 is an explanatory view of the relationship between a net carryover manufacturing overhead allocation cost $\eta$, a manufacturing overhead C, a manufacturing overhead allocation cost $A^{CY}$ and a manufacturing overhead cost variance $\delta$.

The relationship, in costs of goods sold and goods manufactured (or product cost), between the manufacturing overhead C, the manufacturing overhead allocation costs $A^{CX(-)}$ and $A^{CY(+)}$ is represented in FIG. 3. Here, δ is a manufacturing overhead cost variance. From FIG. 3 we obtain Equations 2 and 3:

$$\eta = A^{CX(-)} - A^{CY(+)} \tag{2}$$
$$= A^{CX} - A^{CY}$$

$$\delta = A^{CY} - C \tag{3}$$

If, the "gross profit defined in financial accounting" is named the "sales gross profit" and denoted by Q in Equation 1, it is given by the following equation in accordance with accounting standards regarding generation of P/Ls.

$$Q = X - (D^X + C + \eta) \tag{4}$$

If the "operating profit defined in financial accounting" is named the "sales operating profit" and is denoted by $\pi^O$, it is given by the following equation:

$$\pi^O = Q - G \tag{5}$$

The absorption cost (standard cost) $E^M$ of goods sold is defined to be:

$$E^M = D^X + A^{CX} \tag{6}$$

In standard costing, on a manufacturing floor, a "gross profit $Q^M$ for management accounting" is understood as Equation 7, and maintaining a $Q^M$ or a $Q^M/X$ is continuously demanded by company management.

$$Q^M = X - E^M \tag{7}$$

$E^M$ represents the concept of the costs of goods sold transmitted from the manufacturing floor (a manufacturing direct cost department) to a sales floor (a sales department), and $Q^M$ represents the concept of the gross profit demanded as a profit management goal from the company to the sales floor. Since the concept of $Q^M$ does not exist in accounting theory, the applicant named $Q^M$ the "managed gross profit" in order to be distinguished from the sales gross profit Q. On this basis, the applicant names the theory presented here the "managed gross profit theory".

If $\pi^{MO}$ is defined as Equation 8, the concept of $\pi^{MO}$ is that of the operating profit which is demanded as a profit management goal from the company to the sales department and controlled in sales management. $\pi^{MO}$ is named the "managed operating profit".

$$\pi^{MO} = Q^M - G \tag{8}$$

In each accounting department of the company, the relationship in Table 2 holds, and finally, in the profit and loss integration department (d), individual department accounts are integrated and unified so as to obtain $\pi^O$. The integration of (a) to (d) of Table 2 is consistent with Equation 1.

TABLE 2

| DEBIT | CREDIT |
|---|---|
| (a) MANUFACTURING DIRECT COST DEPARTMENT | |
| $E^M = (D^X + A^{CX})$ | X |
| $Q^M$ | |
| $E^M$: ABSORPTION COST (STANDARD COST) | |
| (b) MANUFACTURING OVERHEAD DEPARTMENT | |
| C | $A^{CY}$ |
| δ | |
| δ: MANUFACTURING OVERHEAD VARIANCE | |
| (c) GENERAL ADMINISTRATIVE COST DEPARTMENT | |
| G | $Q^M$ |
| $\pi^{MO}$ | |
| $\pi^{MO}$: MANGED OPERATING PROFIT | |
| (d) PROFIT AND LOSS INTEGRATION DEPARTMENT | |
| $\pi^O$ | $\pi^{MO}$ |
| | δ |
| $\pi^O$: SALES OPERATING PROFIT | |

An integrated table of (b), (c) and (d) in FIG. 2 is made. If we eliminate both δ and $\pi^{MO}$ from the integrated table and add $A^{CX}$ to both sides, we have a relationship as represented in Table 3.

TABLE 3

| ITEM | DEBIT | CREDIT |
|---|---|---|
| MANAGED GROSS PROFIT | | $Q^M$ |
| SALES MANUFACTURING OVERHEAD ALLOCATION COST | | $A^{CX}$ |
| MANAGED FIXED COST | F = η + C + G | |
| SALES OPERATING PROFIT | $\pi^O$ | |

Table 3 is equivalent to the following equation.

$$\pi^O = Q^M + A^{CX} - F \tag{9}$$

In Japanese Laid-Open Patent Application Publication No. H09-305677 (Patent Document 1) and Patent Document 2, since it has been assumed that both allocation costs, a variable allocation cost $A^{CXI}$ (the first kind of allocation cost) and a fixed allocation cost $A^{CXII}$ (the second kind of allocation cost), exist in $A^{CX}$, Equation 9 is converted as follows:

$$\pi^O = Q^M + A^{CXI} + A^{CXII} - F \tag{10}$$

Here, if $\tan \alpha = A^{CXI}/X$ (sales manufacturing overhead allocation rate) is defined, Equation 10 can be converted to be:

$$\pi^O = Q^M + X \tan \alpha + A^{CXII} - F \tag{11}$$

In Equation 11, if $Q^M$ as a marginal value representing the locus of ($Q^M$, X) satisfying $\pi^O=0$ is denoted by $Q^M_\xi$, we obtain the following:

$$Q^M_\xi = F - X\tan\alpha - A^{CXII} \qquad (12)$$

From Equation 12 we find that the following is established:

$$(Q^M_\xi + A^{CXII})/F + X/(F/\tan\alpha) = 1 \qquad (13)$$

Therefore, $\pi^O$ is expressed as follows:

$$\pi^O = Q^M - Q^M_\xi \qquad (14)$$

Equations 13 and 14 are graphically represented as shown in FIG. 1. The locus of ($Q^M_\xi$, X) is the marginal managed gross profit line (Line-1) in FIG. 1. $X_{(X)}$ represents the break-even point sales amount in the case of standard costing. When $A^{CXII}=0$ is set, FIG. 2, drawn in the form of a conventional 45-degree-line break-even chart equivalent to FIG. 1, is obtained. We have $X_{(X)} = F/(1-D^X/X)$ from FIG. 2.

Figure 4:
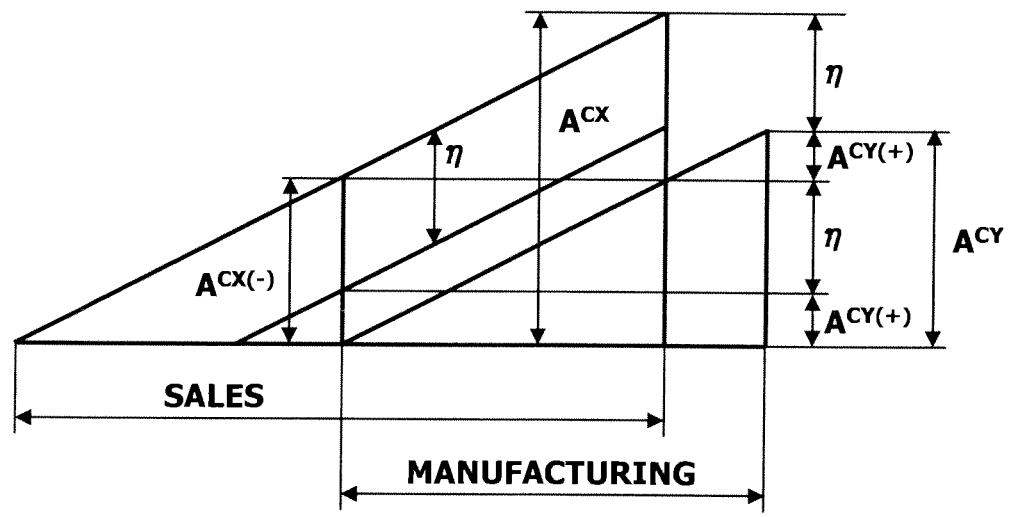
FIG. 4 is an explanatory view illustrating that it is possible to treat the net carryover manufacturing overhead allocation cost $\eta$ as a fixed cost.

Obviously, each of $A^{CX}$ and $A^{CY}$ in $F = \eta$ (=$A^{CX}-A^{CY}$)+C+G in Table 3 is a fixed cost. Why may we treat $\eta$ as a fixed term? The answer differs between the applicant and Solomons as stated below. In Patent Document 2, the applicant argued that, in the case of $\eta=0$, $\eta$ must be treated as a fixed cost because both break-even points between direct and standard costing are the same; the break-even chart in standard costing must be consistent with that presented in predecessor's theories. However, in the subsequent study, the applicant found that a relationship as shown in FIG. 4 is established between $A^{CX}$ and $A^{CY}$. A manufacturing overhead allocation basis must be continuously preserved every year in accordance with accounting standards. In FIG. 4, $A^{CX}$ and $A^{CY}$ are parallel to each other, therefore $\eta$ can be treated as a fixed cost.

Meanwhile, $\eta = A^{CX} - (\delta + C)$ is obtained by Equations 2 and 3. Solomons argued that $A^{CX}$ is a variable cost and $\delta$ is a fixed cost. At this point, Solomons made an error. If $A^{CX}$ and $\delta$ are treated as described above, in FIG. 1, the line representing $F = C + \eta + G$ becomes an oblique line. The description thus far is that of the derivation of the profit charts presented in Patent Documents 1 and 2 and the addition of a portion of the sequential study.

Hereinafter, problems which arose after the report of Patent Document 2 and means for solving the problems will be described below. All descriptions below, excepting the brief introduction for the marginal profit chart in direct costing, are not prior art.

1. Setting of Preparatory Conditions

In FIG. 1, it has been assumed that there are two kinds of allocation costs, the first, $A^{CXI}$ and the second, $A^{CXII}$. However, if $A^{CXII}$ is used, the line providing the amount of $Q^M$, that is, the managed gross profit ratio line (Line-2) does not pass the origin of the coordinate plane. This conflicts with a general sense for a profit ratio, that is, a profit ratio line will pass through the origin. Therefore, an improvement was required such that the profit ratio line should pass through the origin. This is simply solved by abolishing $A^{CXII}$. In the case of $A^{CXII}=0$, we obtain the "managed gross profit ratio"=$Q^M/X=\tan\beta$ such that the managed gross profit ratio line (Line-2) pass through the origin, and this has provided no undesirable consequences. The following descriptions relate to charts in the case of $A^{CXII}=0$.

The following descriptions will be made bearing comparison with direct costing. Thus, a marginal profit chart in direct costing will be introduced in brief. If $V^D$ denotes a marginal profit in direct costing, it is defined to be:

$$V^D = X - D^X \qquad (15)$$

Let $F^D$ denote a fixed cost in direct costing, $F^D$ is defined to be:

$$F^D = C + G \qquad (16)$$

Figure 5:
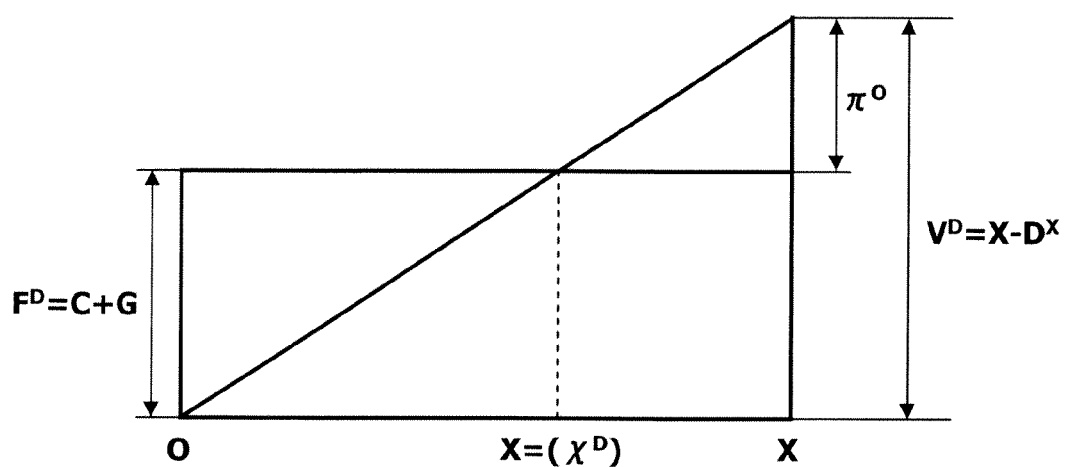
FIG. 5 is an explanatory view of a direct-costing marginal profit chart.

A marginal profit chart in direct costing is illustrated in FIG. 5. $\pi^O$ represented in FIG. 5 is the one in the case of $A^{CX(-)} = A^{CY(+)}$. FIG. 5 is named the "direct-costing marginal profit chart" or the "DC marginal profit chart".

2. Improvement of Managed Gross Profit Chart and Use Thereof

Figure 6:
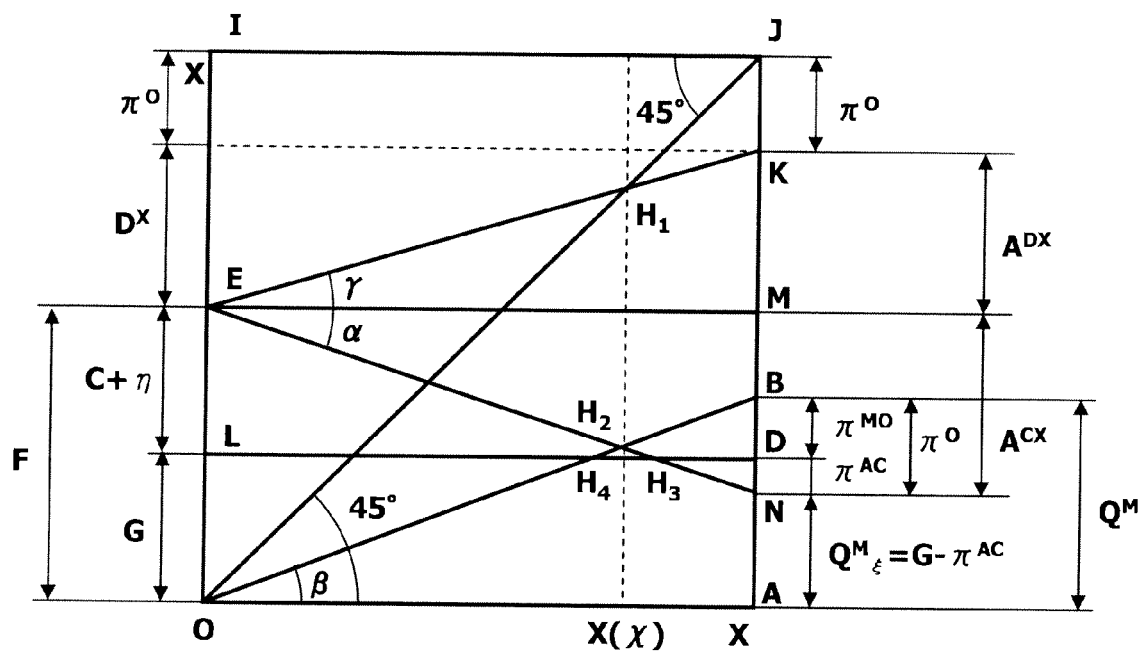
FIG. 6 is an explanatory view of a method of getting an improved managed gross profit chart from FIG. 2.
Figure 7:
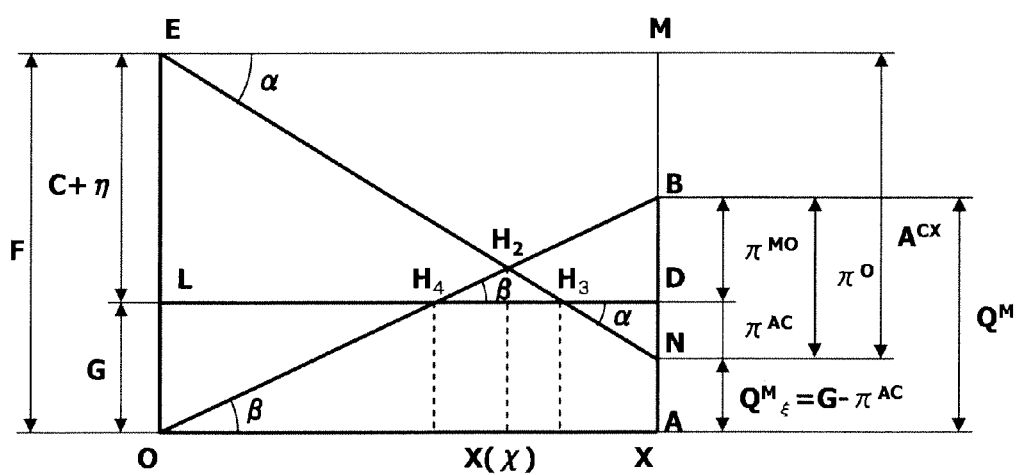
FIG. 7 is an explanatory view of the improved managed gross profit chart.

In the study after the starting point of the managed gross profit line was set to the origin, it was found that a relationship as shown in FIG. 6 is established between the 45-degree-line break-even chart FIG. 2 and FIG. 1. FIG. 7 expresses a lower portion of the managed gross profit chart FIG. 6. In this specification, FIG. 7 is named the "improved managed gross profit chart". The difference between FIG. 7 and FIG. 1 having the start point of Line-2 at the origin O is as follows. In FIG. 7, there is a horizontal line segment LD dividing F into C+$\eta$ and G, while there is no such a line segment in FIG. 1. From FIG. 7 and Equations 2 and 3, the following equations are obtained.

$$\begin{aligned}\pi^{AC} &= A^{CX} - (C + \eta) \qquad (17)\\ &= A^{AY} - C \\ &= \delta\end{aligned}$$

$$\pi^O = \pi^{MO} + \pi^{AC} \qquad (18)$$

As shown in FIG. 3, $A^{CY}$ is an allocation cost corresponding to C. From Equation 18, since $\pi^{AC}$ is the concept of a profit, $\pi^{AC}$ is named the "allocation profit". $\pi^{MO}$ is the managed operating profit, and from FIG. 7, $\pi^{MO}$ is a profit which is in proportion to line segment $H_4D$ when G is a fixed cost. From Equation 17, it is found that in the case of $\delta > 0$, the sales operating profit $\pi^O$ is greater than $\pi^{MO}$ by $\pi^{AC}$ (=$\delta$).

It has been said that the problem in standard costing is that $\eta$ exists and has an effect on the current operating profit $\pi^O$. For this reason, direct costing in which the manufacturing overhead is considered as a period cost (not as an allocation cost) has been proposed in order to eliminate the effect of $\eta$. However, this is not very important. In FIG. 5 under direct costing, only the value of $V^D = X - D^X$ is indicated on the right side vertical axis. In FIG. 7 under standard costing, on the right side vertical axis, it is apparently shown that, not only in the case of $\eta \neq 0$, even in the case of $\eta = 0$, $\pi^O$ is the sum of $\pi^{MO}$ and $\pi^{AC}$. In other words, under direct costing, the only information which influences $\pi^{MO}$ is '$V^D - F^D$', while in standard costing, $\pi^O$ is affected by the information $\pi^{MO}$ and $\pi^{AC}$, both of which are independent from each other. The meanings of $\pi^{MO}$ and $\pi^{AC}$ will be considered below.

(1) Meaning of $\pi^{MO}$

Referring to FIG. 7, we have $Q^M = X - E^M$ (=$D^X + A^{CX}$). In a sales department, in terms of cost information, only $E^M$ is given, and all other costs are uncontrollable costs. If G is not given as a general administrative cost ratio, the result of the activities of the sales department is actually determined by $Q^M$ in an accounting period obtained by individual contracts for selling goods, and if G is a fixed cost, a period-end result of the sales department is evaluated based upon the amount of $\pi^{MO} = Q^M - G$.

(2) Meaning of $\pi^{AC}$

Meanwhile, the expenditure of a manufacturing department is observed. The quantity of goods sold including semi-manufactured goods is proportional to an absorption cost $E^M$.

Therefore, $E^M$ is proportional to the quantities of labor and equipment operation. However, the expenditure amount of manufacturing overhead C, a fixed cost (mainly, labor and a depreciation cost), is not proportional to the quantities of labor and equipment operation. This results in an increase (or decrease) in $\pi^{AC}$ and greatly influences the amount of $\pi^O$. For example, if the working system of a factory changes from day shift to day/night shift, in Equation 17, '$A^{CX}$−(C+η)' increases, and thereby $\pi^{AC}$ increases. In other words, $\pi^{AC}$ can become an indicator of the result of the manufacturing department's effort. That is to say, since $\pi^{AC}$ is a manufacturing overhead allocation variance δ from Equation 17, an increase in δ is directly linked with an increase in $\pi^O$. As described above, in FIG. 7, $\pi^O$ is divided into $\pi^{AC}$ and $\pi^{MO}$, and the profit $\pi^O$ can be considered on the basis of the respective information of $\pi^{AC}$ and $\pi^{MO}$. The first important advantage of standard costing is that "the sales operating profit $\pi^O$ is composed of the sales-department profit $\pi^{MO}$ and the manufacturing-department profit $\pi^{AC}$" as shown in FIG. 7. This gives tremendous power in business judgment. There is the following example.

Figure 8:
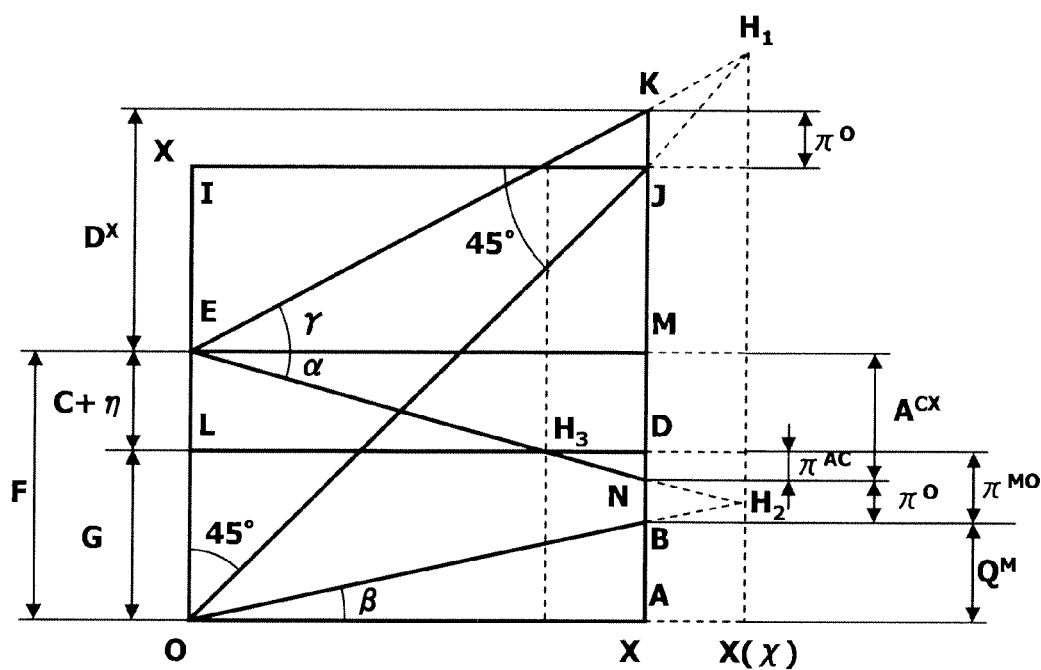
FIG. 8 is a view for considering reasons of why a company may be in deficit.

If the balance of a company is always in the black, no serious problems occur in managing the company. When the balance of the company goes into the red, the manager needs to determine the causes. As review material about that problem, FIG. 7 is helpful. FIG. 8 is a modification of FIG. 7 for finding causes in the case in which a business line department is in the red, that is, $\pi^O$ is a negative value. It is assumed that a manufacturing overhead allocation basis is appropriately determined. In FIG. 8, we have $\pi^{AC}$=NM−DM>0 where X is greater than point $H_3$. Therefore, there is no problem with respect to the sales amount for recouping the manufacturing overhead. Meanwhile, the deficit of $\pi^{MO}$ (=AB−AD) is as large as $\pi^O$ is negative. Therefore, this shows that the cause of the deficit is that although the sales amount was growing, there was a problem in the sales department ($Q^M$ was excessively small).

With regard to $\pi^{AC}$, for example, the following consideration is possible. $\pi^{AC}$ is actually the manufacturing overhead cost variance δ from Equation 17, and as long as the manufacturing overhead allocation basis is appropriate, $\pi^{AC}$ is actually a result of a capacity variance. This also represents the influence of business fluctuations. An increase in a deficit of $\pi^{AC}$ means insufficient sales or excessive equipment. The company must improve the management on the basis of the break-even point regarding $\pi^{AC}$.

3. Derivation of SC Marginal Profit Chart and Use Thereof.

In practical work, profit management using FIG. 7 was conducted for a while in the applicant's company. However, as described above, even though FIG. 7 has the great advantage of providing management information by separating $\pi^{MO}$ and $\pi^{AC}$, there was scant movement to actively use the profit chart of FIG. 7 in the applicant's company. Accounting employees have been trained in direct costing, and understand the 45-degree-line break-even chart and the marginal profit chart. In FIG. 7, important numerical values are tan β=$Q^M$/X, F=η+C+G and tan α=$A^{CX}$/X. Tan α is almost a constant in a business line department since the manufacturing overhead allocation basis is determined in advance. The applicant emphasized the importance of managing the fixed cost F and tan β representing the resultant earning ability. However, since the accounting employees were not trained in the chart of FIG. 7 in their academic education, they could not grasp a sense of understanding why the line of F, which the applicant stresses a fixed cost, is not a horizontal but an oblique line, and have strong negative reactions to FIG. 7. For this reason, it was required to construct a theory of making a profit chart, under standard costing, in which F is a horizontal line.

Figure 9:
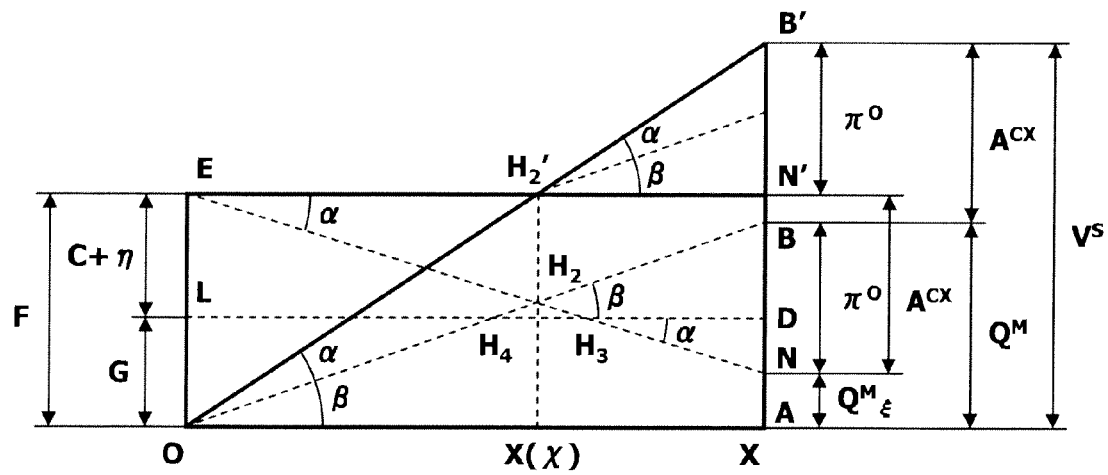
FIG. 9 is an explanatory view of a SC marginal profit chart.

Furthermore, as a result of continuing study, FIG. 9 equivalent to FIG. 7 was found at long last. FIG. 7 is transformed into FIG. 9 through the following procedure. In FIG. 7, line segment BN is moved up by $A^{CX}$, such that oblique line segment EN is located at the position of EM, that is, becomes horizontal. FIG. 9 is thereby obtained. As a result, points N and B in FIG. 7 move to points N' and B' in FIG. 9, respectively. Since AB'=$Q^M$+$A^{CX}$ in FIG. 9, the length of line segment B'N' is $\pi^O$ in Equation 9. In FIG. 9, line segment EN and line segment OB may be shown by solid lines; however, the chart becomes complicated. Similar to FIG. 6, a combination of FIGS. 7 and 2, FIGS. 9 and 2 may be combined as one chart.

FIG. 9 shows an identical form to the marginal profit chart of direct costing. The marginal profit $V^D$ in direct costing is defined by Equation 15. Then, in FIG. 9 under standard costing, the symbol $V^S$ is defined by the following equation, and the relationship between $V^D$ and $V^S$ are examined.

$$V^S = Q^M + A^{CX} \quad (19)$$

Equation 19 can be transformed to the following by using Equations 6 and 7. Since $V^S$+$A^{CX}$+$Q^M$=$A^{CX}$+(X−$D^X$−$A^{CX}$)=X−$D^X$, we obtain $V^S$=$V^D$. Therefore, standard costing shown in FIG. 9 and direct costing shown in FIG. 5 differ in that F=C+η+G holds in standard costing, whereas F=C+G in direct costing, and in the case of η=0, both profit charts of standard costing and direct costing become the same. Therefore, FIG. 9 expressing a standard costing profit chart includes the DC marginal profit chart. FIG. 9 is named the "standard-costing marginal profit chart" or the "SC marginal profit chart".

A difference between FIGS. 9 and 5 is that η appears in F in FIG. 9 but does not in FIG. 5 (η=0). Actually, the existence of η is the reason that an increase (decrease) in a next-period inventory causes an increase (decrease) in the current operating profit in standard costing, as pointed out by Jonathan N. Harris. If $A^{CX(-)}$=0 is assumed, with increased amount of $A^{CY(+)}$, the cost $A^{CX}$ included in X decreases and thereby $\pi^O$ increases.

FIGS. 9 and 5 are similar in appearance, but are different in content and are very different in importance in accounting theory. For example, we consider a percentage pay system where pay compensation is $0.1X_1$ when a sales amount X is $X_1$. Most people would naturally think that, pay compensation will be $0.2X_1$ when the sales amount X is $2X_1$. However, that is not actually the way in which the sales operating profit increases or decreases. As shown in FIG. 9, according to standard costing, $\pi^O$ does not increase or decrease at the rate of tan β (=$Q^M$/$X_1$). In reality, "$\pi^O$ increases or decreases at the rate of 'tan α+tan β' under standard costing; furthermore, tan α (=$A^{CX}$/X) is almost a constant with respect to each business line department or similar goods; and tan β is determined by the result of the sales department's profit-earning ability". The standard-costing profit chart shown in FIG. 9 has the second important advantage of transmitting the information that $\pi^{MO}$ actually increases or decreases with X as mentioned above. In direct costing shown in FIG. 5, only the difference between $V^D$ and $F^D$ is given. Therefore, it will be difficult for people other than persons who thoroughly understand the theoretical background shown in FIG. 9 to understand the way in which sales operating profit increases or decreases according to FIG. 5.

Transactions between a company and customers are not automatically carried out with a uniform sales operating profit ratio. Each sales product transaction (Price×Quantity) is carried out between a customer and a sales department employee (hereinafter, referred to as the sales department), in competition with the products of other companies, as a result of transaction negotiations having different conditions. Therefore, profit management means sales management as long as product quality is maintained a certain level or more. As described above, since the cost of goods sold in the sales department is the standard cost, the management of sales is equal to that of the managed gross profit. Therefore, the sales department is always pressed to make a decision about whether to make a sales contract, keeping in mind the managed operating profit for each transaction.

The sales department is given the standard cost for each unit of products by the manufacturing department. In this case, if the general administrative cost (hereinafter, always including a sales cost) is a fixed cost, it is difficult to calculate the sales operating profit ratio between costs of goods sold and the sales amount. For this reason, the sales department desires a profit chart representing the relationship between sales amount X and sales operating profit $\pi^O$ for each unit of sales transaction; the chart treats the general administrative cost, a fixed cost, as a variable cost. If this chart does not exist, the sales department focuses entirely on increasing the sales amount. As a result, even if the sales department increases $A^{CX}$, the decrease of $\pi^{MO}$ would be greater than the increase of $A^{CX}$, thereby decreasing $\pi^O$. For this demand, FIG. 9 is helpful. The manufacturing overhead allocation ratio tan $\alpha$, $A^{CX}/X$ is almost a constant in each business line department or for each similar kind of products. The managed gross profit ratio tan $\beta$, $Q^M/X$ is determined by decision-making of the sales department in response to each sales transaction amount. Thus, the company may give the general administrative cost ratio as a constant and demand the securing of the sales operating profit ratio $\pi^O/X$ as a profit management target.

Figure 10:
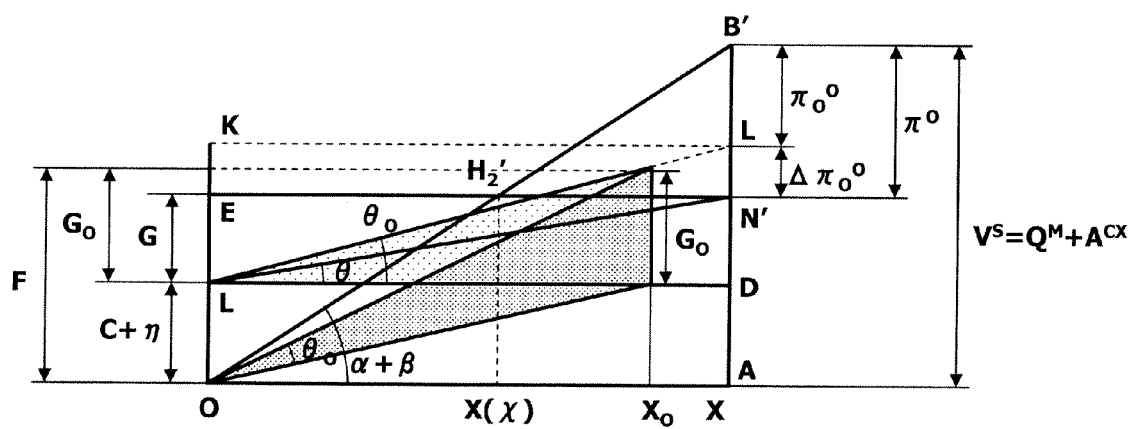
FIG. 10 is an explanatory view of the chart processing method in the case of giving a general administrative cost ratio as a constant in the SC marginal profit chart during profit planning.

This will be described referring to FIG. 10. A planned sales amount is denoted by $X_0$ ($X > X_0$), and a planned general administrative cost is denoted by $G_0$. Tan $\theta_0 = G_0/X_0$ and tan $\theta = G/X$ are defined in FIG. 10. In the case of tan $\theta_0 >$ tan $\theta$, $\Delta\pi_0^O = (\tan\theta_0 - \tan\theta)X > 0$ is further defined. As long as tan $\theta_0$ is used as the general administrative cost ratio, since the sales operating profit $\pi_0^O$, which is smaller than the true sales operating profit $\pi^O$ by $\Delta\pi_0^O$, is calculated; therefore $\Delta\pi_0^O$ should be added to $\pi_0^O$ in order to obtain the sales operating profit $\pi^O$ on a settlement date. Furthermore, consider the case in which the general administrative cost allocated to the business line department is not necessarily proportional to the sales amount. Since the sales amount ratio of each business line department previously determined during the planning varies on the settlement date, the general administrative cost ratio allocated to the business line department also varies. Since correcting of all of these differences is a laborious operation, it is preferable to make a planned profit chart when X and G of FIG. 10 are set to $X_0$ and $G_0$, respectively and to make a decision referring to the planned profit chart during the accounting period; and to give an actual general administrative cost G of each business line department as a horizontal line in an actual profit chart. When an actual P/L is likely to change more than the planned P/L, it is easier to remake a profit plan. Through the method, the sales department can independently manage the sales amount X and the sales operating profit $\pi^O$.

4. Graphic Processing of Direct Cost Variance in Standard Costing

In standard costing, in making the entry of a direct cost, a standard cost ADX is often used instead of an actual cost $D^X$.

In this case, a minute allocation cost variance occurs, for which a handling method is necessary. For example, the case of costing using actual wages (such as a labor cost) $W^X$ in a manufacturing direct cost as a variable standard-cost $A^{WX}$ will be described. If $W^X$ is separated from another actual manufacturing direct cost $D^{X_1}$, (a) of Table 2 and Table 3 are converted into Tables 4 and 5. In other words, it is appropriate to set $D^X = D^{X_1} + A^{WX}$ and to treat $\Delta_W$ (standard labor cost variance) as a correction value to be added to C. In actual management, order decreases caused by seasonal factors and business fluctuations may mean the entire labor cost is not absorbed in the direct costs, and a cost for administrative leave or standby may occur. This cost may be named, for example, the "hiring maintenance cost", separate from $\Delta_W$, and be treated as an independent cost item in the manufacturing overhead. In a P/L regarding actual calculation, accounts may not be kept in a succinct form as shown in the notation system presented in this specification. Even in such a case, the methods of Tables 4 and 5 may be used.

TABLE 4

| ITEM | DEBIT | CREDIT |
|---|---|---|
| SALES AMOUNT | | X |
| SALES MANUFACTURING DIRECT COST (ACTUAL COST) | $D^{X_1}$ | |
| MANUFACTURING DIRECT LABOR COST (STANDARD COST) | $A^{WX}$ | |
| MANUFACTURING OVERHEAD ALLOCATION COST | $A^{CX}$ | |
| MANAGED GROSS PROFIT | $Q^M$ | |

TABLE 5

| ITEM | DEBIT | CREDIT |
|---|---|---|
| MANAGED GROSS PROFIT | | $Q^M$ |
| SALES MANUFACTURING OVERHEAD ALLOCATION COST | | $A^{CX}$ |
| $\eta = A^{CX} - A^{CY} = A^{CX(-)} - A^{CY(+)}$ | $\eta$ | |
| MANUFACTURING OVERHEAD (ACTUAL COST) | C | |
| STANDARD LABOR COST VARIANCE | $\Delta_W = W^X - A^{WX}$ | |
| GENERAL ADMINISTRATIVE COST | G | |
| SALES OPERATING PROFIT | $\pi^O$ | |

In Table 5, if $\Delta_W$ is used as a representative symbol of the difference between an actual variable cost and a standard variable cost, that is, a cost difference, we have $F = \eta + C + G + \Delta_W$. However, since $\Delta_W$ is a small value, during an accounting period which is not the settlement date, even if profit management is carried out under the assumption of $\Delta_W = 0$, no large error occurs in $\pi^O$. In manufacturing costing, the labor cost is conventionally treated as a variable cost. However, in public business for example, the labor cost should really be treated as a fixed cost. In this case, the labor cost should essentially be treated as a manufacturing overhead cost; the actual labor cost $W^X$ will be located under debit and the standard labor cost $A^{WX}$ under credit.

5. Numerical Calculation Examples and New Break-Even Point Formula

A numerical calculation example for the invention and an applicant's new break-even point formula will be described. A new break-even point formula under standard costing is presented. In a P/L accounting system, the following equation holds in FIG. 9.

$$\pi^O = A^{CX} + Q^M - F = (\tan\alpha + \tan\beta)X - F \quad (20)$$

where $\tan\alpha = A^{CX}/X$. Since the break-even point sales amount is X satisfying $\pi^O=0$, when the standard costing break-even point sales amount is denoted by $X_{(X)}$, the following equation is obtained:

$$X_{(X)}=F/(\tan\alpha+\tan\beta) \quad (21)$$

In FIG. 6, it is possible to easily confirm that the following equation holds:

$$\tan\alpha+\tan\beta+\tan\gamma=1 \quad (22)$$

where $\tan\gamma=D^X/X$ (variable cost ratio).

Therefore, the following equation is obtained.

$$X_{(X)}=F/(1-\tan\gamma) \quad (23)$$

Since the break-even point formula under direct costing is $X_{(X)}=(C+G)/(1-\tan\gamma)$, it can be seen that Equations 21 and 23 are general break-even point formulae including both direct and standard costing.

Tables 6 and 7 are for profit management tables during an accounting period. In the tables, $A^{CX(-)}$ and $A^{CY(+)}$ are set to the exaggerated values 10 and 15, respectively.

TABLE 6

| ITEM | DEBIT | CREDIT | REMARKS |
|---|---|---|---|
| SALES AMOUNT X | | 1,000 | |
| COST OF GOODS SOLD | | | |
| DIRECT MANUFACTURING COST (ACTUAL) $D^X$ | 760 | | |
| MANUFACTURING OVERHEAD ALLOCATION COST $A^{CX}$ | 110 | | $A^{CX(-)} = 10$ |
| MANAGED GROSS PROFIT $Q^M$ | 130 | | |

TABLE 7

| ITEM | DEBIT | CREDIT | REMARKS |
|---|---|---|---|
| MANAGED GROSS PROFIT $Q^M$ | | 130 | |
| MANUFACTURING OVERHEAD (ACTUAL) C | 125 | | |
| MANUFACTURING OVERHEAD ALLOCATION COST $A^{CY}$ | | 115 | $A^{CY(+)} = 15$ |
| GENERAL ADMINISTRATIVE COST G | 70 | | |
| SALES OPERATING PROFIT $\pi^O$ | 50 | | |

$$\eta = A^{CX(-)} - A^{CY(+)} = 10 - 15 = -5$$

$$F = \eta + C + G = -5 + 125 + 70 = 190$$

$$\tan\alpha = A^{CX}/X = 110/1,000$$

$$\tan\beta = Q^M/X = 130/1,000$$

$$\tan\gamma = 760/1,000$$

$$\tan\alpha + \tan\beta = 240/1,000$$

$$X_{(X)} = F/(\tan\alpha + \tan\beta) = 190/(240/1,000) = 792$$

$$X_{(X)} = F/(1-\tan\gamma) = 190/(1-760/1,000) = 792$$

$$\pi^O = (\tan\alpha+\tan\beta)(X-X_{(X)}) = (240/1,000)(1,000-792) = 50$$

6. Other Matters

For simplicity FIGS. 7 and 9 express profit charts (break-even charts) regarding only a sales operating profit P/L. However, if interest paid, corporation tax and extraordinary profit and loss are considered for F in Equation 9, it is apparent that a post-tax current profit chart is obtained instead of a sales operating profit chart. The present invention also includes a method of making the post-tax profit chart.

Since $\eta$ has thus far not been used in preparing a P/L, it may be difficult to understand why $\eta$ is necessary for drawing a chart. To this end, Table 8, equivalent to Table 3, is shown. Table 8 is obtained simply by moving $\eta$ from credit to debit. Table 3 shows an account relationship representing FIG. 9; and Table 8 shows an account relationship holding in general P/Ls on the assumption that $Q^M$ is temporarily defined. A profit chart representing Table 8 is obtained by replacing values of F and $V^S$ in FIG. 9 with C+G and $Q^M+A^{CY}$, respectively.

TABLE 8

| ITEM | DEBIT | CREDIT |
|---|---|---|
| MANAGED GROSS PROFIT | | $Q^M$ |
| MANUFACTURING OVERHEAD DEPARTMENT ACCOUNT | C | $A^{CY}$ |
| GENERAL ADMINISTRATIVE COST | G | |
| SALES OPERATING PROFIT | $\pi^O$ | |

In Table 8, if negative C is added to both sides of the account and '$A^{CY}-C$' is replaced with $\delta$ on the basis of Equation 17, Table 9, mathematically equivalent to Table 3, is obtained. In this case, a profit chart is obtained by replacing values of $A^{CX}$ and F in FIG. 9 with $\delta$ and G, respectively.

TABLE 9

| ITEM | DEBIT | CREDIT |
|---|---|---|
| MANAGED GROSS PROFIT | | $Q^M$ |
| MANUFACTURING OVERHEAD DEPARTMENT ACCOUNT | | $\delta$ |
| GENERAL ADMINISTRATIVE COST | G | |
| SALES OPERATING PROFIT | $\pi^O$ | |

However, the applicant does not recommend the use of the profit charts corresponding to Tables 8 and 9. The reason being that, although Tables 8 and 9 are mathematically equivalent to Table 3, each form and break-even point sales amount of the three profit charts differ, because debit represents a fixed cost and credit represents a variable cost; therefore profit charts corresponding to both Tables 8 and 9 do not satisfy Equations 22 and 23. However, the profit charts representing Tables 8 and 9 are also included in the present invention.

The applicant obtained FIGS. 2, 7, and 9, which are break-even charts under standard costing and the break-even point formulae, by the derivation of very complex theoretical equations and complicated chart-transformation through Patent Documents 1 and 2 and this specification while referring to documents of historical predecessors. Furthermore, the consequently obtained profit charts and break-even point formulae are very simple and include the profit charts and the break-even point formula from direct costing. At present, when simple and clear results have been obtained, it is possible to describe the meaning of the profit charts and the break-even point formulae more briefly. From Equation 1, $\pi^O = X - (D^X + C + \eta + G)$ is obtained. $\pi^O$ can be modified as follows.

$$\pi^O = [X - (D^X + A^{CX}) - G] + [A^{CX} - (C+\eta)]$$

$$= [Q^M - G] + [A^{CX} - (C+\eta)] = \pi^{MO} + \pi^{AC}$$

This equation is expressed as the chart of FIG. 7. $\pi^O$ can be modified as follows.

$$\pi^O = [X - (D^X + A^{CX})] + A^{CX} - (C + \eta + G)$$
$$= [Q^M + A^{CX}] - F$$

This equation is expressed as the chart of FIG. 9. If a sales amount X satisfying $\pi^O=0$ is obtained, X becomes the break-even point sales amount. A key point of the chart drawing method provided by the applicant is that it was found that $\eta$ can be treated as a fixed cost, that is to say, can be included in F.

First Embodiment

A break-even chart is fundamentally a profit chart, regarding a P/L (a profit and loss account for an entire accounting period). However, management accounting is meaningless if profit and loss accounting (monthly cumulative profit and loss accounting) is not carried out monthly. For this, it is desirable that the profit charts presented by the present invention be used as time-series profit management charts. It is desired that the time-series profit management charts will eventually correspond to the P/L. This may sound simple, but in practice, anticipated values do not necessarily correspond to actual values because increases in sales amount X and management gross profit $Q^M$, anticipated in the previous month, vary due to changes in the economic environment and those of conditions from an informal promise to a finished contract. An actual final amount of fixed cost F is presented after the printout of accounting documents (usually one or two months later); and thus an expected value of F to the current month on a budgetary document should be used. Furthermore, since fixed cost F will vary depending on the judgment of the manager (if fixed cost F is not treated as a variable cost, profit management is meaningless), F's anticipated value itself varies. In order to make profit management successful, it is necessary to create a cooperative system composing of individual organizations throughout the entire company including a profit management department; quickly generate profit management table data by bold predictions from the profit management department; and disclose the profit charts shown in FIG. 7 or 9 to each organization of the company through a local area network (LAN) or the like.

This process will be described below. Let a company belong to an individual job-order production industry. It is assumed that it takes 5 or 6 months from order to completion, product delivery and recognition of the sales amount. An inspection basis is used for the recognition of the sales amount. It is assumed that a planned P/L has been set at the beginning of period. It is assumed that in the case in which an implemented condition is greatly different from a planned condition, the planned P/L is remade. A time-series profit management table is referred to simply as the "profit management table". The date of the i-th month when total data of a profit management table are fixed is referred to as the "i-th month". We have two expressions for the profit management table of every i-th month. In the first profit management table, a planned annual fixed cost of the accounting period, F ($=\eta$+ C+G) is used for each i-th month's data. For the data of sales amount X and its managed gross profit $Q^M$, the sum of the two kinds of sales amount are adopted; the first being recognized product's sales amount within the present accounting period; the other being that which has been contracted, is now in the process of production and is scheduled for completion within the present period. According to this table, if there are no new orders from the month succeeding the i-th month onward, a deficit in the P/L will be caused. Then, it is instructed that in order to obtain the planned sales operating profit, new orders capable of further increasing the managed gross profit $Q^M$ be required. In the second profit management table, we adopt the above-mentioned data up to the i-th month on the percentage of completion basis (and optionally, appropriate estimated values thereof) as the i-th month data X and $Q^M$. As for F, if a determined value of the i-th month has been entered in the books, that value is adopted as data. If the determined value for F has not been entered in the books, we adopt the sum of the determined cumulative total $[F_{i-1}]$ up to the previous month and the i-th month ($F_i$) estimated from the planned P/L. In this profit management table, we can observe the present company's business condition.

Table 10 explains the second profit management table. Although the number of business line departments is not limited, in Table 10, it is assumed that the entire company is comprised of two departments: Business Line Department A and Business Line Department B. Although the number of manufacturing overhead departments is not limited, it is assumed that there are two departments, Equipment Rental Cost Department 1 and Common Cost Department 2. The data of Business Line Department B will not be written. Only data processing on the entire company will be described. The cumulative sales amount determined as the sales of the i-th month (that is, products recognized as the sales amount) is denoted by $[X]_i$ (Row 1). The cumulative sales amount on the percentage completion basis of the current unrecognized sales at the i-th month (inventory) expressed as undetermined in Table 10 is denoted by $(X)_i$ (Row 6). The sum of $[X]_i$ and $(X)_i$ is denoted by $X_i$ and is referred to as an expected sales amount in Table 10 (Row 11).

In Table 10, the processing of Rows 11 to 23 is similar to the process for obtaining a general P/L. However, in a general P/L, Rows [15] and [16] are not indicated. This is because absorption cost $E^M$ in Row 12 is not apparently defined in conventional P/L generation theory. Furthermore, in the processing of Rows 11 to 23, $\eta$ does not appear. This reason has been described with the difference between Tables 3 and 8. It is clear that if each of the numerical values of Rows [24], [25], and [26] is obtained, it is possible to draw FIGS. 7 and 9 using those numerical values and the values in Table 10.

TABLE 10

| ROW | ITEM COLUMN | ENTIRE COMPANY | | BUSINESS LINE DEPART. A | | BUSINESS LINE DEPART. B | |
|---|---|---|---|---|---|---|---|
| | | a DEBIT | b CREDIT | c DEBIT | d CREDIT | e DEBIT | f CREDIT |
| 1 | DETERMINED SALES $X_0$ | | $[X]_i$ | | $[X_A]_i$ | OMITTED | OMITTED |
| 2 | DETERMINED ABSORPTION COST $[E^M]$ | $[E^M]_i$ | | $[E^M_A]_i$ | | | |

TABLE 10-continued

| ROW | ITEM COLUMN | ENTIRE COMPANY | | BUSINESS LINE DEPART. A | | BUSINESS LINE DEPART. B | |
|---|---|---|---|---|---|---|---|
| | | a DEBIT | b CREDIT | c DEBIT | d CREDIT | e DEBIT | f CREDIT |
| 3 | DETERMINED DIRECT MANUFACTURING COST [$D^X$] | $[D^X]_i$ | | $[D^X_A]_i$ | | | |
| 4 | DETERMINED MANUFACTURING OVERHEAD [$A^{CX}$] | $[A^{CX}]_i$ | | $[A^{CX}_A]_i$ | | | |
| 5 | DETERMINED MANAGED GROSS PROFIT [$Q^M$] | $[Q^M]_i$ | | $[Q^M_A]_i$ | | | |
| 6 | UNDETERMINED SALES (X) | | $(X)_i$ | | $(X_A)_i$ | | |
| 7 | UNDETERMINED ABSORPTION COST ($E^M$) | $(E^M)_i$ | | $(E^M_A)_i$ | | | |
| 8 | UNDETERMINED MANUFACTURING DIRECT COST ($D^X$) | $(D^X)_i$ | | $(D^X_A)_i$ | | | |
| 9 | UNDETERMINED MANUFACTURING OVERHEAD ($A^{CX}$) | $(A^{CX})_i$ | | $(A^{CX}_A)_i$ | | | |
| 10 | UNDETERMINED MANAGED GROSS PROFIT ($Q^M$) | $(Q^M)_i$ | | $(Q^M_A)_i$ | | | |
| 11 | EXPECTED SALES $X = [X]_i + (X)$ | | $X_i$ | | $X_{Ai}$ | | |
| 12 | EXPECTED ABSORPTION COST $E^M$ | $E^M_i$ | | $E^M_{Ai}$ | | | |
| 13 | EXPECTED MANUFACTURING DIRECT COST $D^X$ | $D^X_i$ | | $D^X_{Ai}$ | | | |
| 14 | EXPECTED MANUFACTURING OVERHEAD $A^{CX}$ | $A^{CX}_i$ | | $A^{CX}_{Ai}$ | | | |
| [15] | EXPECTED MANAGED GROSS PROFIT $Q^M = [Q^M] + (Q^M)_i$ | $Q^M_i$ | | $Q^M_{Ai}$ | | | |
| [16] | EXPECTED MANAGED GROSS PROFIT $Q^M$ | | $Q^M_i$ | | $Q^M_{Ai}$ | | |
| 17 | EXPECTED MANUFACTURING OVERHEAD DEPARTMENT ACCOUNT | $C_i$ | $A^{CY}_i$ | $C_{Ai}$ | $A^{CY}_{Ai}$ | | |
| 18 | EXPECTED EQUIPMENT RENTAL COST DEPARTMENT 1 | $C_{1i}$ | $A^{CY}_{1i}$ | $C_{1Ai}$ | $A^{CY}_{1Ai}$ | | |
| 19 | EXPECTED COMMON COST DEPARTMENT 2 | $C_{2i}$ | $A^{CY}_{2i}$ | $C_{2Ai}$ | $A^{CY}_{2Ai}$ | | |
| [20] | SALES GROSS PROFIT Q | $Q_i$ | | $Q_{Ai}$ | | | |
| [21] | SALES GROSS PROFIT Q | | $Q_i$ | | $Q_{Ai}$ | | |
| 22 | GENERAL ADMINISTRATIVE COST G | $G_i$ | | $G_{Ai}$ | | | |
| 23 | SALES OPERATING PROFIT $\pi^O$ | $\pi^O_i$ | | $\pi^O_{Ai}$ | | | |
| [24] | REFERENCE VALUE $\eta = A^{CX} - A^{CY}$ | $\eta_i$ | | $\eta_{Ai}$ | | | |
| [25] | REFERENCE VALUE $F = \eta + C + G$ | $F_i$ | | $F_{Ai}$ | | | |
| [26] | REFERENCE VALUE $\pi^O = Q^M + A^{CX} - F$ | $\pi^O_i$ | | $\pi^O_{Ai}$ | | | |

Operational expressions of the data of Table 10 are shown in Table 11. Applied expressions represent the numbers of corresponding equations in this specification.

TABLE 11

| ROW | OPERATIONAL EXPRESSION | APPLIED EQUATION |
|---|---|---|
| 2 | (2, a) = (3, a) + (4, a) | EQUATION (6) |
| 5 | (5, a) = (1, b) − (2, a) | EQUATION (7) |
| 7 | (7, a) = (8, a) + (9, a) | EQUATION (6) |
| 10 | (10, a) = (6, b) − (7, a) | EQUATION (7) |
| 11 | (11, b) = (1, b) + (6, b) | |
| 12 | (12, a) = (13, a) + (14, a) | |
| 13 | (13, a) = (3, a) + (8, a) | |
| 14 | (14, a) = (4, a) + (9, a) | |
| [15] | (15, a) = (5, a) + (10, a) | EQUATION (7) |
| [16] | (16, b) = (15, a) | |
| (17, a) | (17, a) = (18, a) + (19, a) | |
| (17, b) | (17, b) = (18, b) + (19, b) | |
| [20] | (20, a) = (11, b) − (13, a) − (17, a) − ((14, a) − (17, b)) | EQUATION (4) |
| [21] | (21, b) = (20, a) | |
| 23 | (23, a) = (20, a) − (22, a) | EQUATION (5) |
| [24] | (24, a) = (14, a) − (17, b) | EQUATION (2) |
| [25] | (25, a) = (24, a) + (17, a) + (22, a) | TABLE 3 |
| [26] | (26, a) = (15, a) + (14, a) − (25, a) | EQUATION (9) |

Figure 11:
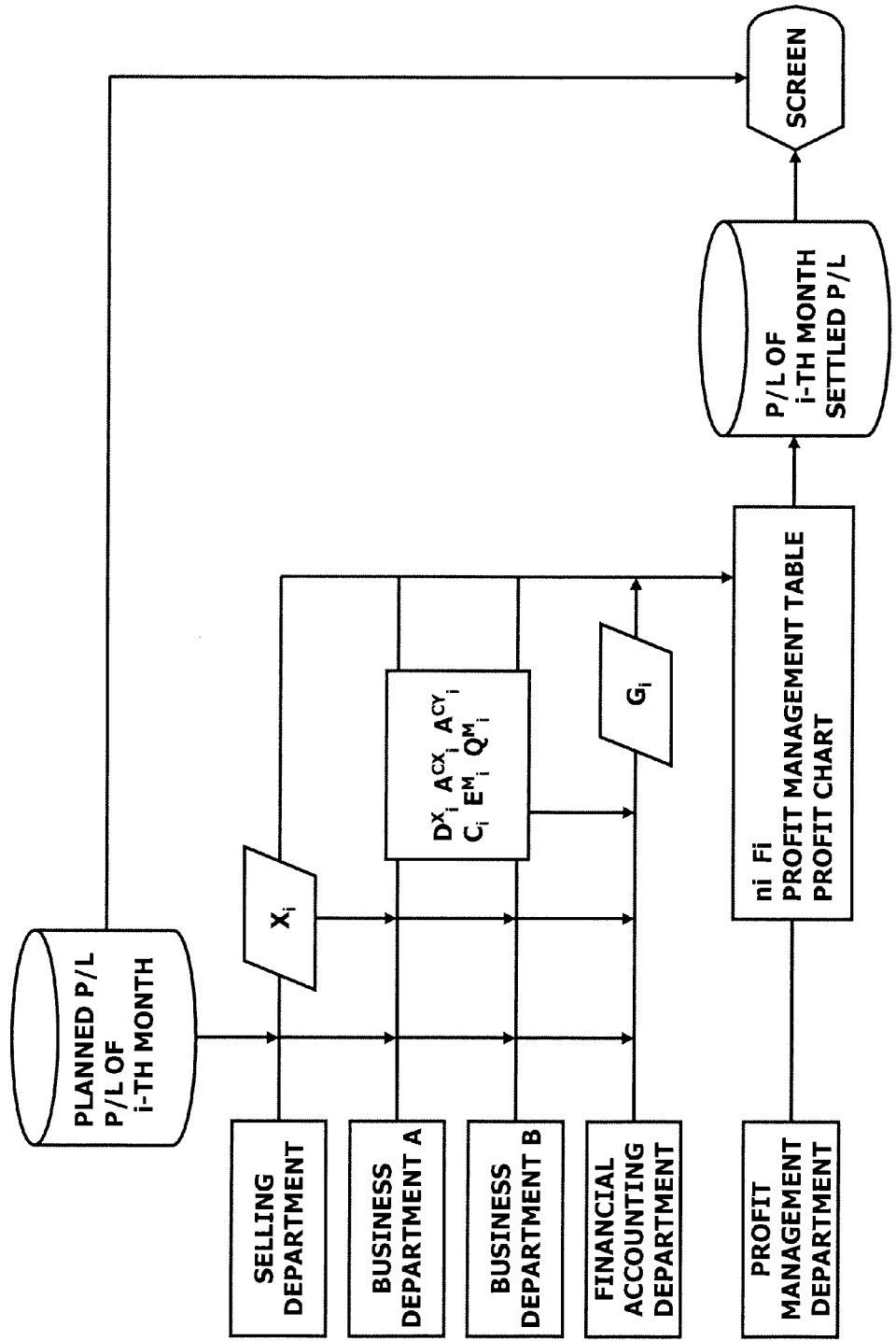
FIG. 11 is an explanatory view of data transmission and reception for generating a profit management table within a company, and a system that discloses a profit chart drawn based on the data transmission and reception through an information network in a company.

FIG. 11 shows transmission and reception of profit management table data between a profit management department and the organizational departments of an entire company, and a process of disclosing a profit management table and a SC marginal profit chart through a computer information network within the company. With respect to data, no method of distinguishing between Business Line Departments A and B is shown in FIG. 11. The profit management department receives the i-th month data shown in Table 10 from individual associated departments, mutually adjusts the data such that there is no conflict between the individual departments, and completes Table 10. With the completion of Table 10, data necessary for generating a profit chart are obtained from Rows [24], [25] and [26]. A database receives the i-th month profit management table generated by using that data; a combined chart of FIGS. 2 and 9; or a combined chart of FIGS. 2 and 7. The table and the charts are disclosed across the company through a LAN or the like.

Second Embodiment

Figure 12:
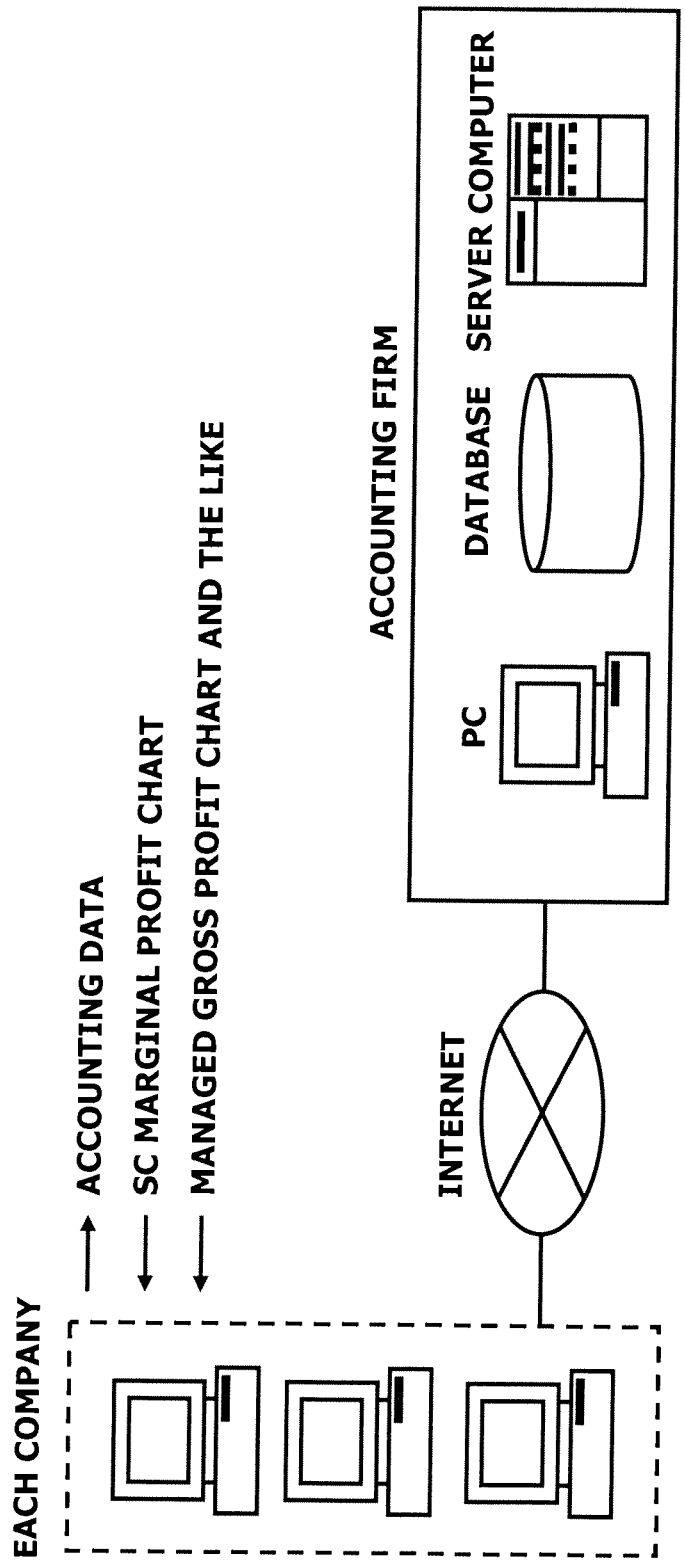
FIG. 12 is an explanatory view of transmission and reception of accounting data including a profit chart between a company and an external accounting service provider.

A process of a business method, which enables an accounting service provider to conduct P/L generation work and profit management resource generation work including the provision of the marginal profit chart obtained in the first embodiment, is shown in FIG. 12. The business method is composed of the procedure between the company in which the above-mentioned profit charts are transmitted and collected through the computer information network and an accounting service provider for the company. The business method includes the following steps: the company transmits accounting data to the accounting service provider through the computer information network; and the accounting service provider converts the accounting data into the above-mentioned SC marginal profit charts and transmits accounting information including those SC marginal profit charts back to the company.

Next, an example of an accounting system for providing a SC marginal profit chart will be described.

Figure 13:
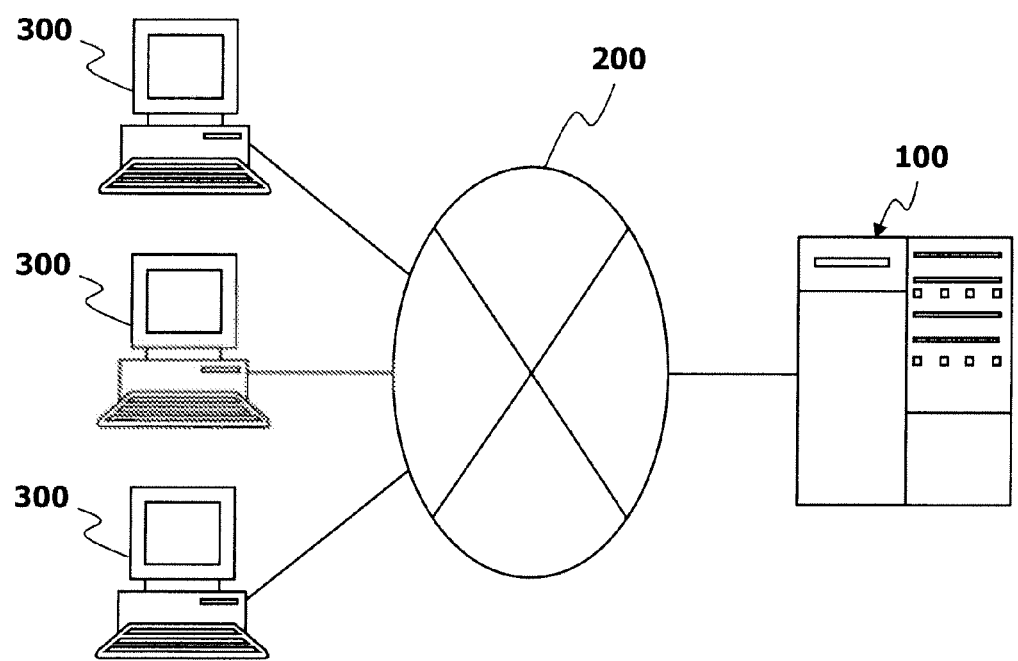
FIG. 13 is a system configuration view illustrating an example of an accounting system.

In FIG. 13, a server computer 100 set in the profit management department or an accounting firm or the like is connected to at least one client computer 300, each of which is operated by a user who receives the SC marginal profit charts through a network 200 such as the Internet. The server computer 100 may be constructed by a plural of computers.

Figure 14:
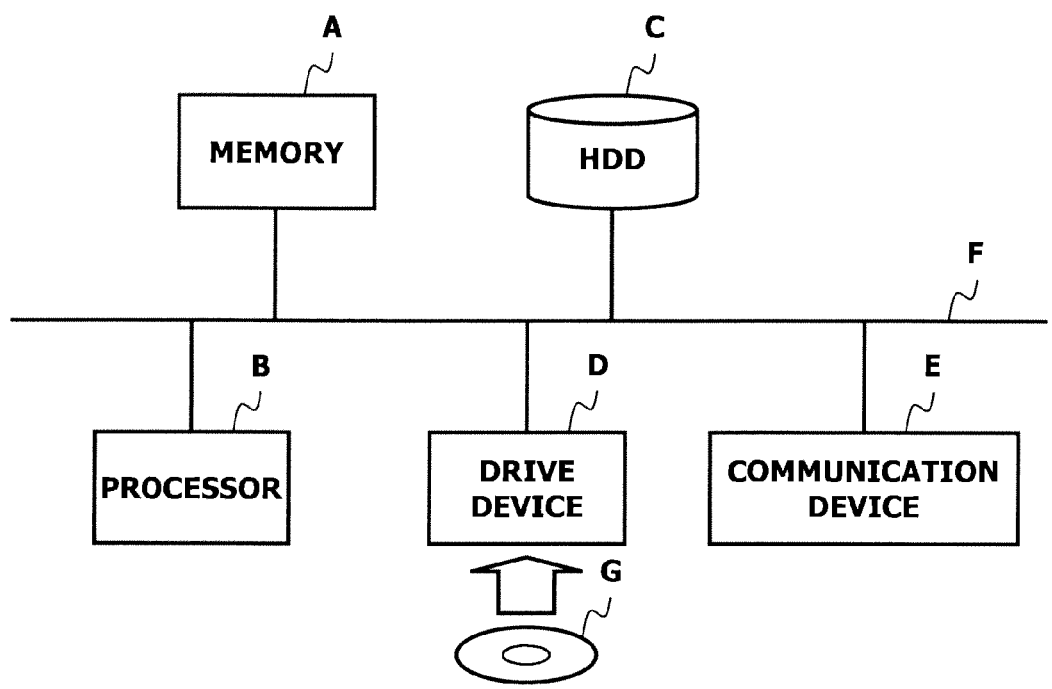
FIG. 14 is an explanatory view of an internal configuration of a server computer and a client computer.

The server computer 100 and the client computer 300 include a memory A, a processor B such as a central processing unit (CPU), a hard disk C, a drive device D and a communication device E, as shown in FIG. 14. The memory A, the processor B, the hard disk C, the drive device D and the communication device E are connected to one another by buses F such as a serial AT attachment (ATA). The drive device D reads data from a removable disk G such as a compact disk read only memory (CD-ROM) and a digital versatile disk read only memory (DVD-ROM) or the like. Instead of the removable disk G, a universal serial bus (USB) memory having a built-in flash memory, and so on can be used. The communication device E is a network interface card (NIC) or the like for connecting the server computer 100 and the network 200, and the network 200 and the client computer 300.

Figure 15:
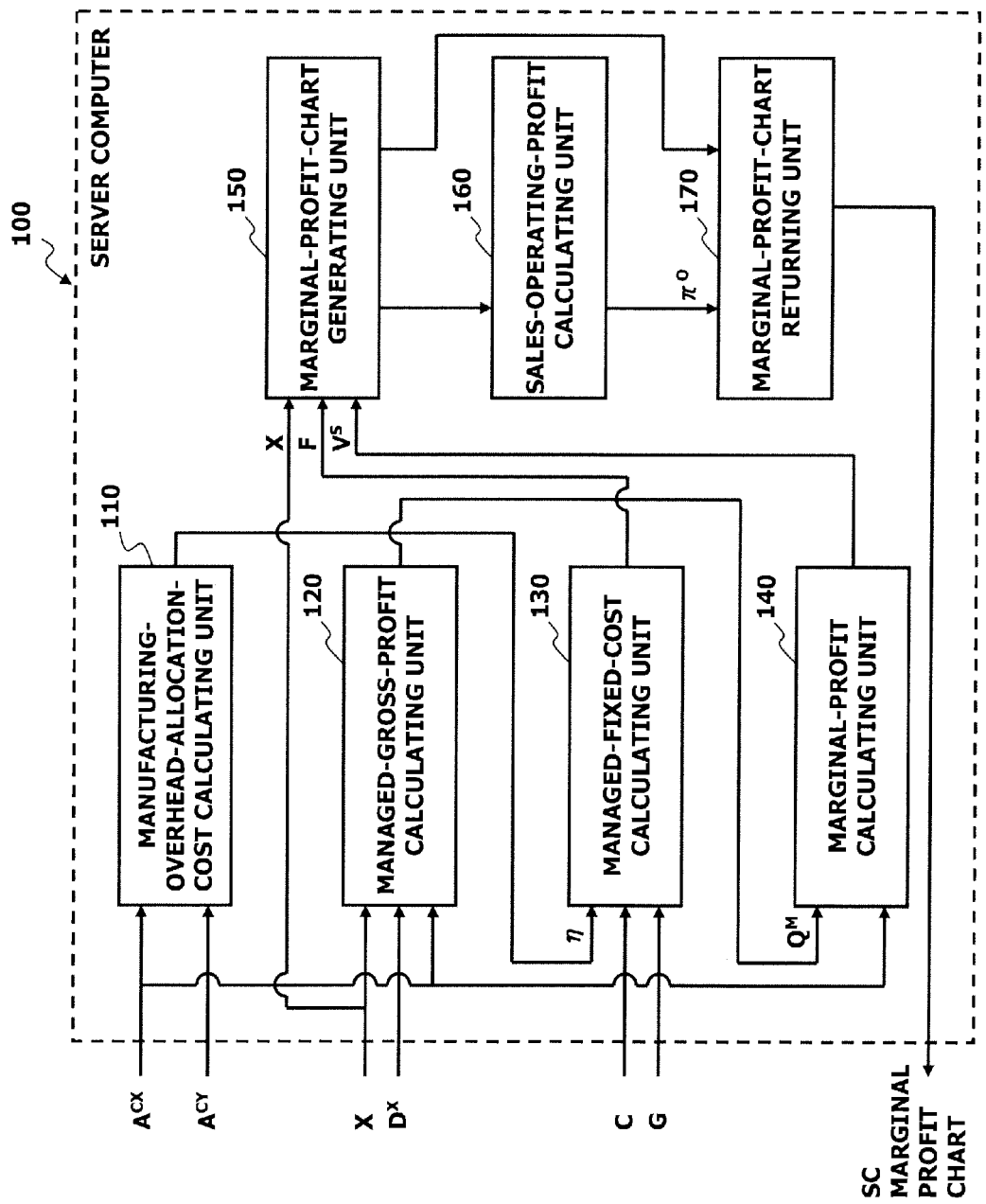
FIG. 15 is a functional block diagram of a server computer that provides the marginal profit chart.

The processor B of the server computer 100 executes an accounting program developed in the memory A, and implements each of a manufacturing-overhead-allocation-cost calculating unit, Unit 110, a managed-gross-profit calculating unit, Unit 120, a managed-fixed-cost calculating unit, Unit 130, a marginal-profit calculating unit, Unit 140, a marginal-profit-chart generating unit, Unit 150, a sales-operating-profit calculating unit, Unit 160, and a marginal-profit-chart returning unit, Unit 170, as shown in FIG. 15. Furthermore, Unit 110, Unit 120, Unit 130, and Unit 140 are activated in response to a request for providing a SC marginal profit chart including accounting data from the client computer 300. Here, the accounting data includes a manufacturing overhead allocation cost $A^{CX}$ distributed to goods sold, a manufacturing overhead allocation cost $A^{CY}$ distributed to manufactured products, a sales amount X, a direct manufacturing cost $D^X$, a manufacturing overhead C, and a general administrative cost G.

Unit 110 calculates a net carryover manufacturing overhead allocation cost η from the equation '$\eta=A^{CX}-A^{CY}$', on the basis of the manufacturing overhead allocation cost $A^{CX}$ and the manufacturing overhead allocation cost $A^{CY}$. Unit 120 calculates the managed gross profit $Q^M$ from the equation '$Q^M=X-D^X-A^{CX}$', on the basis of the sales amount X and the direct manufacturing cost $D^X$. Unit 130 calculates the managed fixed cost F from the equation '$F=C+\eta+G$' on the basis of the net carryover manufacturing overhead allocation cost η calculated by Unit 110, the manufacturing overhead C, and the general administrative cost G. Unit 140 calculates a standard-costing marginal profit (hereinafter, referred to as a "marginal profit" $V^S$ from the equation '$V^S=Q^M+A^{CX}$', on the basis of the managed gross profit $Q^M$ calculated by Unit 120, and the manufacturing overhead allocation cost Unit 150 generates the SC marginal profit chart as shown in FIG. 9, on the basis of the sales amount X, the managed fixed cost F calculated by Unit 130, and the marginal profit $V^S$ calculated by Unit 140. Unit 160 calculates a sales operating profit $\pi^O$ which is defined in financial accounting, on the basis of the SC marginal profit chart generated by Unit 150. Unit 170 returns the SC marginal profit chart generated by Unit 150, and the sales operating profit $\pi^O$ calculated by Unit 160, to the client computer 300 that has issued the request for providing the SC marginal profit chart.

Figure 16:
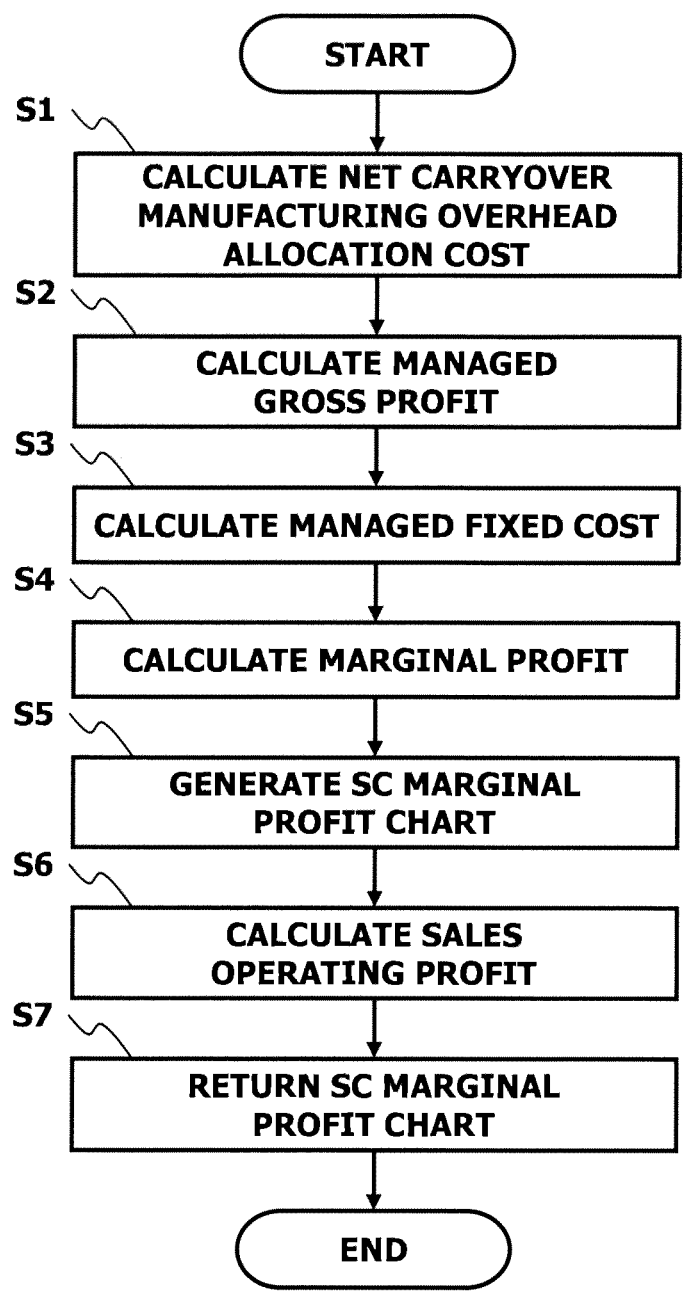
FIG. 16 is a flowchart of the process for providing the SC marginal profit chart.

FIG. 16 shows an example of the SC-marginal-profit-chart providing process of the server computer 100.

In STEP 1 (S1, hereinafter the other steps are similarly abbreviated), Unit 110 calculates the net carryover manufacturing overhead allocation cost η by substituting the manufacturing overhead allocation cost $A^{CX}$ and the manufacturing overhead allocation cost $A^{CY}$ to the equation '$\eta=A^{CX}-A^{CY}$'.

In S2, Unit 120 calculates the managed gross profit $Q^M$ by substituting the sales amount X, the direct manufacturing cost $D^X$, and the manufacturing overhead allocation cost $A^{CX}$ to the equation '$Q^M=X-D^X-A^{CX}$'.

In S3, Unit 130 calculates the managed fixed cost F by substituting the manufacturing overhead C, the net carryover manufacturing overhead allocation cost η, and the general administrative cost G to the equation '$F=C+\eta+G$'.

In S4, Unit 140 calculates the marginal profit $V^S$ by substituting the managed gross profit $Q^M$ and the manufacturing overhead allocation cost $A^{CX}$ to the equation '$V^S=Q^M A^{CX}$'.

In S5, Unit 150 generates the SC marginal profit chart according to the following procedure. As shown in FIG. 9, we set a coordinate plane in which the horizontal axis (transverse axis) represents the sales amount and the vertical axis (longitudinal axis) represents costs plus profit. The origin O is located at the coordinates (0, 0). Point A is located at (X, 0) and point B' is at (X, $V^S$). Line segment AB' and line segment OB' are drawn in the coordinate plane, respectively. Furthermore, η is treated as a fixed cost. Point E is located at (0, F), point N' is at (X, F) and line segment EN' is drawn.

In STEP S6, Unit 160 identifies the intersection point $H_2$' between line segment EN' and line segment OB', as shown in FIG. 9, by using the SC marginal profit chart generated by Unit 150; and point $H_2$' is determined as the sales-operating-profit break-even point with respect to the P/L under standard costing. Then, Unit 160 sets line segment B'N' in the SC marginal profit chart as the sales operating profit $\pi^O$.

In STEP S7, Unit 170 returns the SC marginal profit chart and the sales operating profit $\pi^O$ to the client computer 300 that issued the SC marginal profit chart request. Here, the sales operating profit $\pi^O$ may be represented in the SC marginal profit chart.

Using this accounting system, on receiving the SC marginal profit chart request from the client computer 300, the server computer 100 calculates each of the managed fixed cost F and the marginal profit $V^S$, on the basis of the manufacturing overhead allocation cost $A^{CX}$, the manufacturing overhead allocation cost $A^{CY}$, the sales amount X, the direct manufacturing cost $D^X$, the manufacturing overhead C and the general administrative cost G, as accounting data. Furthermore, the server computer 100 generates the SC marginal profit chart on the basis of the sales amount X, the managed fixed cost F and the marginal profit $V^S$, and calculates the sales operating profit $\pi^O$ from the SC marginal profit chart. Then, the server computer 100 returns the SC marginal profit chart and the sales operating profit $\pi^O$ to the client computer 300 that issued the SC marginal profit chart request, through the network 200.

Here, since the SC marginal profit chart, which is returned to the client computer 300, has a horizontal marginal managed gross profit line, it is possible to promote the use of the profit chart.

The server computer 100 may sequentially accumulate SC marginal profit charts and sales operating profits $\pi^O$ in the database, and provide an SC marginal profit chart and a sales operating profit $\pi^O$ related to a request from the client computer 300, in response to the request.

Standard costing has long been criticized that it cannot be used in management accounting because $\pi^O$ is influenced by the value of $\eta$ in the case of $\eta \neq 0$. However, that is a minor problem, and the real reason behind the criticism is that there had been no CVP charts applicable to practical accounting based on standard costing. This problem is solved because the profit charts based on the present invention include direct-costing profit charts. That is, direct costing is no more than the special case of $\eta=0$ in the profit charts based on the present invention. However, in standard costing, even in the case of $\eta=0$, $A^{CX}$ is found in profit calculation, and $\pi^{AC}$ occupies a large part of $\pi^O$. Particularly, as shown in FIG. 8, $\pi^{AC}$ is indispensable for analyzing the cause of a deficit. According to the present invention, it has become mathematically apparent that if the manufacturing overhead is set as the allocation cost, the difference between the manufacturing overhead and the allocation cost is converted into a profit (or loss). Furthermore, since it is possible to observe the P/L while separating the managed operating profit and the allocation cost, it is possible to grasp the earning results of the sales department and the manufacturing department. Therefore, it has been verified that the manufacturing overhead allocation method, which has up to now been treated as an obstacle to management accounting, is actually a very effective tool for analyzing earnings or losses. Accordingly, standard costing system will be indispensable for performing a standard profit management method, not only in financial accounting but also in management accounting.

It has been very difficult to construct an accounting system integrating both financial accounting and management accounting. The true reason is that definitions of accounting terms are different between financial accounting and the other business operation departments. According to the present invention, since profit terms in business line departments under standard costing are interrelated to those in a financial accounting department by strict definition, it is possible to construct an accounting system integrating management and financial accounting under standard costing. Suppose that a company using standard costing desires to construct an accounting system in which CVP charts must be internally disclosed through a computer information network, wherein both management and financial accounting are integrated; the system enables all the departments including business line, accounting and management departments to participate using common accounting terms. Then the accounting system based on the managed gross profit theory presented by the applicant will be uniquely applicable. Furthermore, this effect will provide great benefits not only to profit management in companies but also to the practical business of management consultants and to accounting education institutions.

In order to allow the improved managed gross profit charts and SC marginal profit charts to be used as a tool for management accounting worldwide, it is necessary to expound the differences between standard costing and direct costing, and to explain how standard costing is useful for management accounting. The present invention answers the above-mentioned requests and explains the superiority of standard costing, which has been limited to financial accounting, over direct costing in management accounting. As a result, this invention will provide company managers, who use standard costing and who make up the vast majority of managers, with a better management accounting technique than in direct costing. It presents accounting system providers with a technology of constructing an accounting system based on this new charting theory in which both management and financial accounting coexist. It gives both accounting service providers and the accounting education field new knowledge which can aid proposal work for business management.

In this invention the data required for profit management are those of $Q^M$, $A^{CX}$, $A^{CY}$, and $F=\eta \ (=A^{CX}-A^{CY})+C+G$, which are recorded monthly and correspond to the expected sales amount X. In particular, fundamental numerical values for absorption costs are prepared for the quotation stage. Therefore, even small and medium-sized companies can operate a profit management system with little effort. However, the present invention should be effectively used in large companies that have large-scale networks. In the present invention, (1) accounting terms which are used in financial and management accounting are uniformly defined, (2) financial and management accounting are theoretically integrated, and (3) standard and direct costing are integrated in a current accounting education. The present invention does not need any special prerequisite in accounting education and can be easily understood by any company department. Therefore, it is now possible to construct an accounting system which all members, from the field staff in business line departments and manufacturing indirect cost departments to head office staff in the accounting and other departments including managers, can use. Thus the benefit becomes greater as the number of employees increases.

With regard to embodiments including the above-mentioned examples, a technical idea will be further disclosed below.

(A) In an accounting business method using standard costing as absorption costing, standard costing includes a method of drawing a marginal profit chart, SC marginal profit chart, providing a break-even point; the profit and loss statements (P/Ls) of both a company and its individual business line departments using absorption costing including standard costing as an input-cost measurement basis are obtained through calculation using a computer; and the method of drawing the marginal profit chart regarding those P/Ls includes the following steps:

As a premise thereof, the following symbols are defined.

X represents a sales amount, $D^X$ represents a manufacturing direct cost (an actual variable cost), C represents a manufacturing overhead (an actual fixed cost), G represents a general administrative cost (an actual fixed cost), $A^{CX}$ represents a manufacturing overhead allocation cost allocated to goods sold currently, $A^{CY}$ represents a manufacturing overhead allocation cost allocated to current manufactured products (excluding inventory brought forward and including inventory carried forward), $(=A^{CX}-A^{CY})$ represents a new carryover manufacturing overhead allocation cost, $Q^M \ (=X-D^X-A^{CX})$ represents a managed gross profit, $\pi^O$ represents a sales operating profit defined in financial accounting, F (=C+η+G) represents a managed fixed cost, and $V^S$ (=$Q^M$+$A^{CX}$) represents a standard-costing marginal profit.

Then, a coordinate plane in which the origin is located at (0, 0) (point O), the horizontal axis represents the sales amount and the vertical axis represents costs plus profit; point A is located at (X, 0) and point B' at (X, $V^S$); and line segment AB' and line segment OB' are drawn. Furthermore, η is treated as fixed cost, point E is located at (0, F), point N' at (X, F) and horizontal line segment EN' is drawn. Then, the point of intersection (referred to as point $H_2'$) between line segment EN' and line segment OB' is identified; the point of intersection $H_2'$ is determined as the sales-operating-profit break-even point with respect to the corresponding standard costing P/L and the length of line segment B'N' is as $\pi^O$.

(B) In an accounting business method using standard costing as absorption costing, managing the sales operating profit monthly and obtaining a P/L at the end of an accounting period, standard costing includes a method of drawing a marginal profit chart (SC marginal profit chart) under standard costing providing a break-even point; the profit and loss statements (P/Ls) of a company and its individual business line departments using absorption costing including standard costing as an input-cost measurement basis are obtained through calculation using a computer; and the method of drawing the SC marginal profit chart regarding those P/Ls includes the following steps:

As a premise thereof, the following symbols are defined.

X represents a sales amount, $D^X$ represents a manufacturing direct cost (an actual variable cost), C represents a manufacturing overhead (an actual fixed cost), G represents general administrative cost (an actual fixed cost), $A^{CX}$ represents a manufacturing overhead allocation cost distributed to goods sold currently, $A^{CY}$ represents a manufacturing overhead allocation cost distributed to current manufactured products (excluding inventory brought forward and including inventory carried forward), η (=$A^{CX}$-$A^{CY}$) represents a net carryover manufacturing overhead allocation cost, $Q^M$ (=X-$D^X$-$A^{CX}$) represents a managed gross profit, $\pi^O$ represents a sales operating profit defined in financial accounting, F (=C+η+G) represents a managed fixed cost, and $V^S$ (=$Q^M$+$A^{CX}$) represents a standard-costing marginal profit.

Then, a coordinate plane in which the origin is located at (0, 0) (point O), the horizontal axis represents the sales amount and the vertical axis represents costs plus profit; point A is located at (X, 0) and point B' at (X, $V^S$); and line segment AB' and line segment OB' are drawn. Furthermore, η is treated as a fixed cost, point E is located at (0, F), point N' at (X, F) and horizontal line segment EN' is drawn. Then, the point of intersection (referred to as point $H_2'$) between line segment EN' and line segment OB' is identified; the point of intersection $H_2'$ is determined as the sales-operating-profit break-even point with respect to the corresponding standard costing P/L and the length of line segment B'N' is as $\pi^O$.

(C) In the accounting business method using standard costing as absorption costing according to (A), the business method includes a method of disclosing the abovementioned charts to a plural of persons in the management accounting department through the computer information network, and includes the following steps.

The method is applied to a certain company that has a management accounting system including a plural of manufacturing direct cost departments, a plural of manufacturing overhead departments, a general administrative cost department, a non-operating profit and loss department, an extraordinary profit and loss department, and a profit and loss integration department and all accounting departments connected to each other through the computer information network, and that uses standard costing. In the method, a P/L for the one company is converted into a break-even chart represented by the SC marginal profit chart of (A), the management accounting departments transmit their accounting data to the server computer through the computer information network; the profit and loss integration department reads the data necessary for calculation from the server computer and optionally adds other data necessary for management, converts the data into the SC marginal profit charts obtained at the previous stage and optionally into a 45-degree-line break-even chart, stores those charts in the server computer and transmits the necessary charts to persons in each management accounting department through the computer information network; and all of the chart information are disclosed to persons in the company by using the computer information network.

(D) In the business method regarding standard costing as absorption costing according to (A), the business method is composed of a company and an accounting service provider for the company, wherein the above-mentioned profit charts are mutually transmitted and received across the computer information network, and the business method includes the following steps.

The company transmits accounting data to the accounting service provider through the computer information network, and the accounting service provider converts the accounting data into the above-mentioned SC marginal profit charts or managed gross profit charts, and transmits accounting information including those SC marginal profit charts back to the company.

What is claimed is:

1. An accounting method, which is executed using a computer, the method comprising:

reading a sales amount X, a manufacturing direct cost $D^X$, a manufacturing overhead C, a general administrative cost G, a manufacturing overhead allocation cost $A^{CX}$ distributed to goods sold and a manufacturing overhead allocation cost $A^{CY}$ distributed to manufactured goods;

calculating, via a computer, a net carryover manufacturing overhead allocation cost η from η=$A^{CX}$-$A^{CY}$ on the basis of the manufacturing overhead allocation costs $A^{CX}$ and $A^{CY}$;

calculating, via a computer, a managed gross profit $Q^M$ from $Q^M$=X-$D^X$-$A^{CX}$ on the basis of the sales amount X, the manufacturing direct cost $D^X$ and the manufacturing overhead allocation cost $A^{CX}$;

calculating, via a computer, a managed fixed cost F from F=C+η+G on the basis of the manufacturing overhead C, the net carryover manufacturing overhead allocation cost η and the general administrative cost G;

calculating, via a computer, a standard-costing marginal profit $V^S$ from $V^S$=$Q^M$+$A^{CX}$ on the basis of the managed gross profit $Q^M$ and the manufacturing overhead allocation cost $A^{CX}$; and locating point O at the origin (0, 0), locating point A at the coordinates (X, 0), locating point B' at (X, $V^S$) and drawing line segment AB' and line segment OB' in a coordinate plane in which the horizontal axis represents a sales amount and the vertical axis represents costs plus profit, locating point E at (0, F), locating point N' at (X, F) and drawing line segment EN' so as to generate a marginal profit chart, under standard costing, that gives a break-even point in the coordinate plane, wherein the line segment EN' is a horizontal marginal managed gross profit line.

2. The accounting method according to claim 1, the method further comprising calculating a sales operating profit $\pi^O$ from line segment B'N' in the marginal profit chart.

3. The accounting method according to claim 2, the method further comprising, when the computer receives a request for provision of the marginal profit chart from another computer connected to the computer through a network, generating the marginal profit chart and calculating the sales operating profit $\pi^O$, and thereafter returning the marginal profit chart and the sales operating profit $\pi^O$ to the computer that issued the request.

4. The accounting method according to claim 1, the method further comprising when the computer receives a request for provision of the marginal profit chart from another computer connected to the computer through a network, generating the marginal profit chart and thereafter returning the generated marginal profit chart to the computer that issued the request.

5. An accounting system comprising:

a manufacturing-overhead-allocation-cost calculating unit that calculates a net carryover manufacturing overhead allocation cost $\eta$ from $\eta=A^{CX}-A^{CY}$, on the basis of a manufacturing overhead allocation cost $A^{CX}$ distributed to goods sold, and a manufacturing overhead allocation cost $A^{CY}$ distributed to manufactured goods;

a managed-gross-profit calculating unit that calculates a managed gross profit $Q^M$ from $Q^M=X-D^X-A^{CX}$ on the basis of a sales amount X, a direct manufacturing cost $D^X$ and the manufacturing overhead allocation cost $A^{CX}$;

a managed-fixed-cost calculating unit that calculates a managed fixed cost F from $F=C+\eta+G$ on the basis of a manufacturing overhead C, the net carryover manufacturing overhead allocation cost $\eta$, and a general administrative cost G;

a marginal-profit calculating unit that calculates a standard-costing marginal profit $V^S$ from $V^S=Q^M+A^{CX}$ on the basis of the managed gross profit $Q^M$ and the manufacturing overhead allocation cost $A^{CX}$; and a marginal-profit-chart generating unit that locates point O at the origin (0, 0), locates point A at the coordinates (X, 0) and locates point B' at (X, $V^S$) to draw line segment AB' and line segment OB' in a coordinate plane in which the horizontal axis represents a sales amount and the vertical axis represents costs plus profit, and locates point E at (0, F) and point N' at (X, F) to draw line segment EN' so as to generate a marginal profit chart of standard costing that gives a break-even point in the coordinate plane, wherein the line segment EN' is a horizontal marginal managed gross profit line.

* * * * *